United States Patent
Watanabe et al.

(10) Patent No.: US 8,872,919 B2
(45) Date of Patent: Oct. 28, 2014

(54) VEHICLE SURROUNDING MONITORING DEVICE

(75) Inventors: Kazuya Watanabe, Anjo (JP); Hideyuki Aikyo, Kariya (JP); Yukihiko Yoshinaga, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 777 days.

(21) Appl. No.: 13/071,036

(22) Filed: Mar. 24, 2011

(65) Prior Publication Data

US 2011/0169955 A1    Jul. 14, 2011

Related U.S. Application Data

(62) Division of application No. 11/359,602, filed on Feb. 23, 2006, now abandoned.

(30) Foreign Application Priority Data

Feb. 24, 2005  (JP) .................................. 2005-048738
Mar. 14, 2005  (JP) .................................. 2005-070635

(51) Int. Cl.
*G06K 9/00* (2006.01)
*H04N 7/18* (2006.01)
*B60R 1/00* (2006.01)

(52) U.S. Cl.
CPC ............ *B60R 1/00* (2013.01); *B60R 2300/8093* (2013.01); *B60R 2300/302* (2013.01); *H04N 7/181* (2013.01); *B60R 2300/307* (2013.01); *B60R 2300/105* (2013.01); *B60R 2300/303* (2013.01); *B60R 2300/806* (2013.01)
USPC ....................................................... 348/148

(58) Field of Classification Search
CPC ....................... G06K 9/00362; G06K 9/00791
USPC ........................................................ 348/148
See application file for complete search history.

(56) References Cited

U.S. PATENT DOCUMENTS 5,444,478 A    8/1995  Lelong et al.
5,670,935 A    9/1997  Schofield et al.
(Continued)

FOREIGN PATENT DOCUMENTS

EP    1 158 803 A1    11/2001
EP    1 168 248 A2    1/2002
(Continued)

OTHER PUBLICATIONS

Japanese Office Action issued in Japanese Application No. 2005-070635 dated Feb. 2, 2010 (with translation) (7 pages).

(Continued)

*Primary Examiner* — Sath V Perungavoor
*Assistant Examiner* — Jeffery Williams
(74) *Attorney, Agent, or Firm* — Sughrue Mion, PLLC

(57) ABSTRACT

A vehicle surrounding monitoring device includes a first capturing device provided at a side of a vehicle in order to capture a first image, a second capturing device provided at front relative to the first capturing device in order to capture a second image, a displaying device for displaying the first image and the second image and for monitoring a vehicle surrounding, an image process device by which a borderline between the first image and the second image is defined in a combined image of the first image and the second image so as to be identical with a straight line connecting a position of the first capturing device and a position of the second capturing device.

5 Claims, 19 Drawing Sheets

(56) References Cited

U.S. PATENT DOCUMENTS

| | | | |
|---|---|---|---|
| 6,396,535 B1 * | 5/2002 | Waters | 348/159 |
| 6,714,139 B2 | 3/2004 | Saito et al. | |
| 6,771,208 B2 * | 8/2004 | Lutter et al. | 342/52 |
| 7,502,048 B2 | 3/2009 | Okamoto et al. | |
| 7,728,879 B2 * | 6/2010 | Ishii | 348/222.1 |
| 2002/0001398 A1 * | 1/2002 | Shimano et al. | 382/104 |
| 2003/0007074 A1 * | 1/2003 | Nagaoka et al. | 348/148 |
| 2003/0085999 A1 | 5/2003 | Okamoto et al. | |

FOREIGN PATENT DOCUMENTS

| | | |
|---|---|---|
| EP | 1 179 958 A1 | 2/2002 |
| EP | 1 231 110 A2 | 8/2002 |
| JP | 7-294251 A | 11/1995 |
| JP | 2000-168475 A | 6/2000 |
| JP | 2001-195699 A | 7/2001 |
| JP | 2001-245131 A | 9/2001 |
| JP | 2002-019556 A | 1/2002 |
| JP | 3300334 B2 | 4/2002 |
| JP | 2003-204547 A | 7/2003 |
| JP | 2004-203068 A | 7/2004 |
| JP | 2004-240480 A | 8/2004 |
| JP | 2005-062910 A | 3/2005 |

OTHER PUBLICATIONS

Japanese Office Action dated Jul. 27, 2010, issued in Japanese Application 2005-048738 (4 pages).

European Search Report issued in European Application No. 06110292.7-2223 dated Jun. 1, 2006 (4 pages).

* cited by examiner

F I G. 12
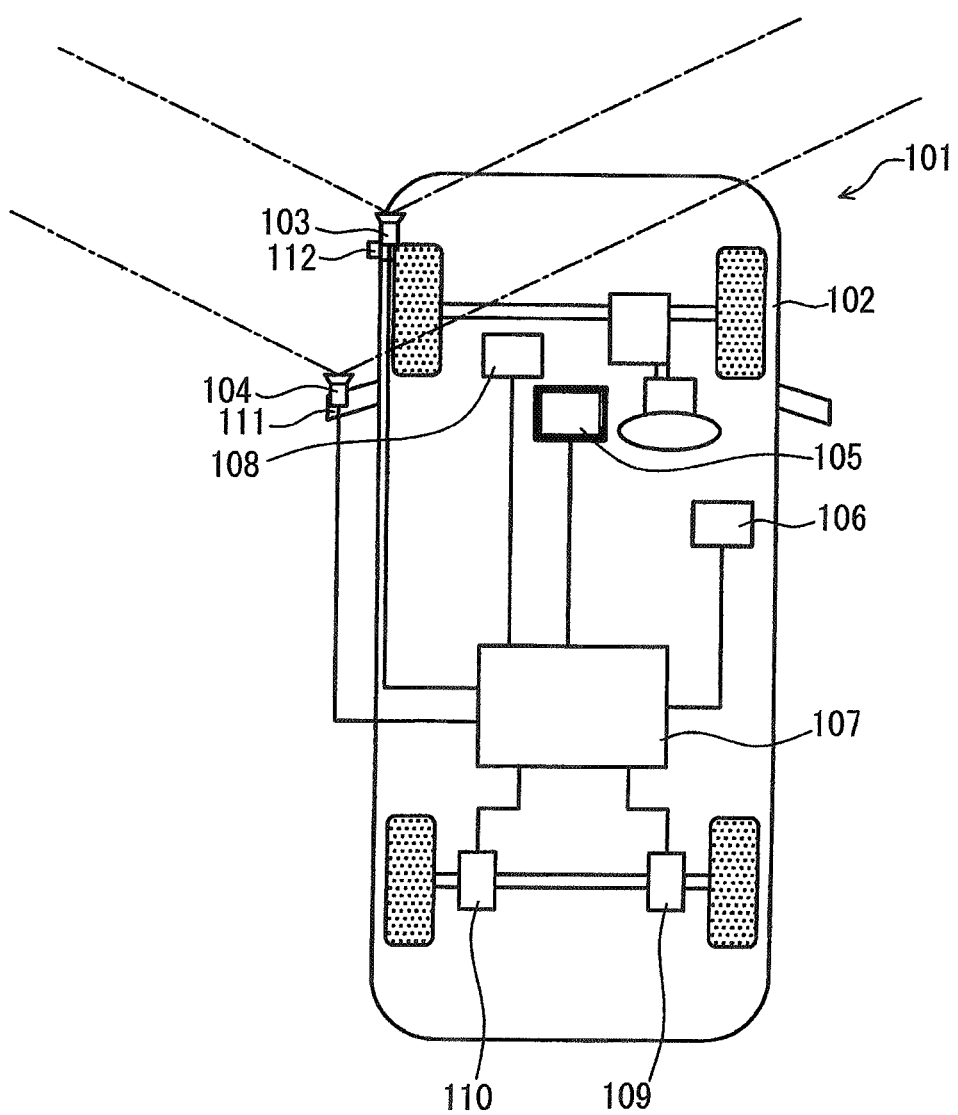

VEHICLE SURROUNDING MONITORING DEVICE

CROSS REFERENCE TO RELATED APPLICATIONS

This application is continuation of U.S. application Ser. No. 11/359,602, filed Feb. 23, 2006, which claims priority under 35 U.S.C. §119 to Japanese Patent Application 2005-048738, filed on Feb. 24, 2005 and Japanese Patent Application 2005-070635, filed on Mar. 14, 2005, the entire contents of which are incorporated herein by reference.

FIELD OF THE INVENTION

This invention relates to a vehicle surrounding monitoring device.

BACKGROUND

A known parking assist device disclosed in JP 2000-168475A includes four CCD cameras (C1, C2, C3 and C4), and each of which is attached to each of four corner portions of the vehicle as shown in FIG. 8. Specifically, the CCD camera C1 captures an image P1, the CCD camera C2 captures an image P2, the CCD camera C3 captures an image P3, and CCD camera C4 captures an image P4. These images are arrayed and displayed on a displaying means of a car navigation device, which is provided near a front installment panel of the vehicle, without any modification. Thus, an area that is out of driver's line of vision can be captured by each of the cameras, and these captured images are displayed so as to be seen in the vehicle in order to supplement the user's view.

Further, a known vehicle surrounding monitoring system is disclosed in JP2002-019556A. FIG. 9 illustrates a schematic view indicating positions of cameras C of a vehicle, and FIG. 10 illustrates a schematic view of a display on a displaying means (not shown). This vehicle surrounding monitoring system includes the plural cameras C, and each of which is attached at a predetermined position of each of the front, rear, left and right of the vehicle. Ranges to be captured by the cameras C are indicated by chain lines in FIG. 9. Images captured by the cameras C are arrayed and displayed on the displaying means as shown in FIG. 10.

Furthermore, another vehicle surrounding monitoring system disclosed in JP3300334C includes plural cameras C and a virtual viewpoint KS as shown in FIG. 11. FIG. 11 explains a relationship between the cameras C and the virtual viewpoint KS. Each camera C is provided at a predetermined position of the vehicle, and a virtual viewpoint KS is set as shown in FIG. 11 in order to create a combined image, in which images captured by the cameras C are combined. On the basis of the combined image, a vehicle surrounding is monitored the surrounding of the vehicle.

However, the parking assist system disclosed in JP2000-168475 cannot display the object seamlessly when each of capturing ranges (C1, C2, C3 and C4) is not overlapped together.

Further, when the monitoring system disclosed in JP2002-019556A displays the images, within the overlapped ranges (hatched area in FIG. 9) which are overlapped together, and as shown in FIG. 10, each of the images are displayed on the displaying device, for example, if the image captured by the front camera and the image captured by the side camera are displayed on the monitoring device, the object existing within the overlapped range of the capturing images is displayed in each of the captured image. Thus, two objects are displayed in the displayed image, as a result, the user may misunderstand that there are two objects in the surrounding of the vehicle, or it becomes difficult for the user to recognize a positional relationship between the vehicle and the object.

Furthermore, the monitoring system disclosed in JP3300334C inputs plural images captured by the plural cameras C, and viewpoints of these images are converted into the virtual viewpoint KS, which is set at a position from which the vehicle is seen from the top thereof. In such case, when the viewpoint of each camera is converted on the basis of a road surface, because a capturing direction of the camera is also be changed, a solid object cannot be captured or captured redundantly, at the same time, because each camera captures the solid object on its different surfaces, the captured images cannot be combined smoothly.

SUMMARY OF THE INVENTION

According to an aspect of the present invention, a vehicle surrounding monitoring device includes a first capturing means provided at a side of a vehicle in order to capture a first image, a second capturing means provided at front relative to the first capturing means in order to capture a second image, a displaying means for displaying the first image and the second image and for monitoring a vehicle surrounding, an image process means by which a borderline between the first image and the second image is defined in a combined image of the first image and the second image so as to be identical with a straight line connecting a position of the first capturing means and a position of the second capturing means.

BRIEF DESCRIPTION OF THE DRAWINGS

The foregoing and additional features and characteristics of the present invention will become more apparent from the following detailed description considered with reference to the accompanying drawings, wherein:

FIG. 12 illustrates a schematic view of the configuration of a third embodiment according to the vehicle surrounding monitoring device of the present invention;

DETAILED DESCRIPTION

Figure 3:
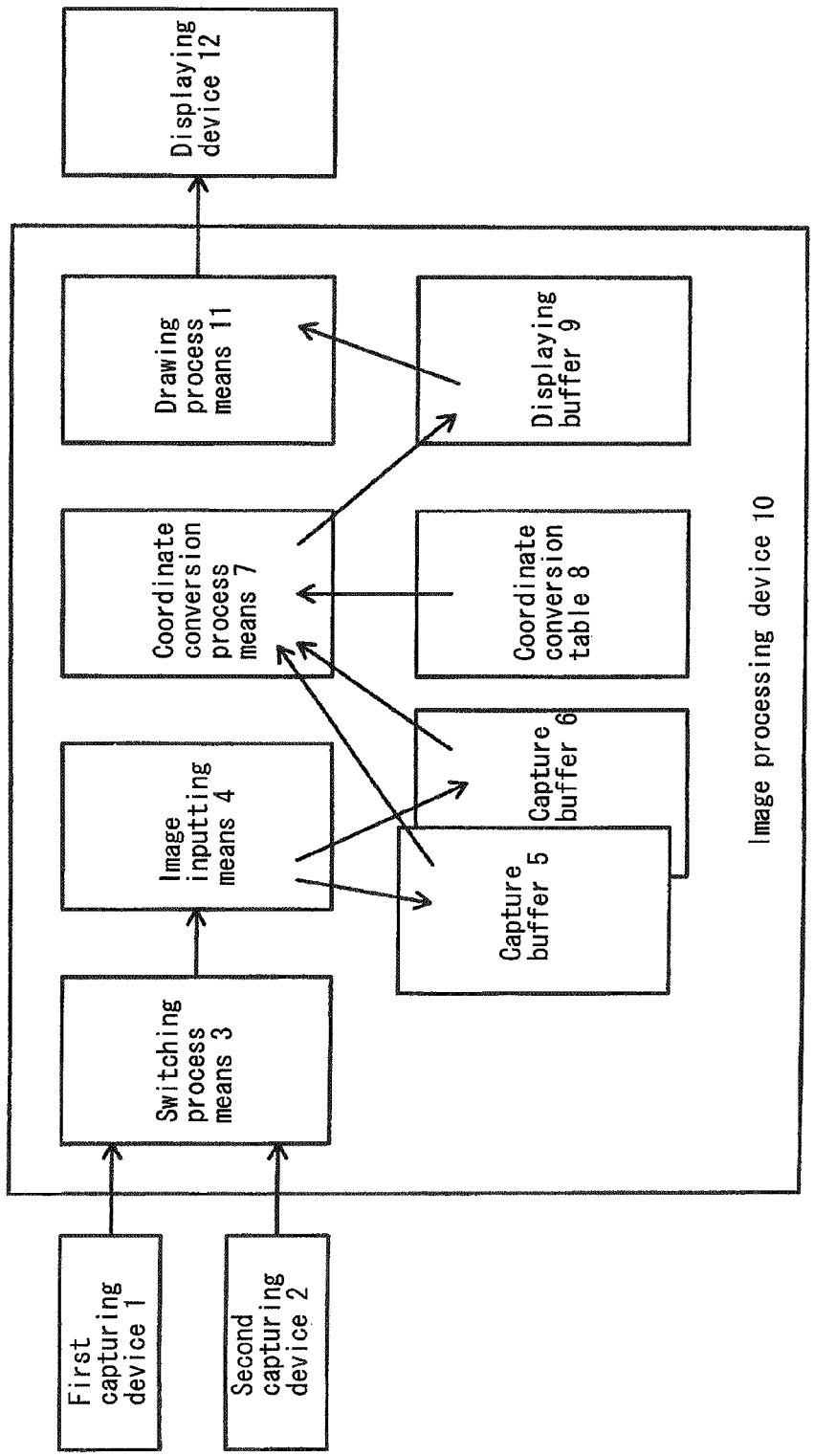
FIG. 3 illustrates a configuration of the vehicle surrounding device and a flow of a image process.

An embodiment of a vehicle surrounding monitoring device according to the present invention will be explained. FIG. 3 illustrates a configuration of the vehicle surrounding device and a flow of an image process. The vehicle surrounding monitoring device according to the present invention includes a first capturing device 1, a second capturing device 2, an image processing device 10 and a displaying device 12 (displaying means). Specifically, the image process device 10 includes a switching process means 3, an image inputting means 4, a capture buffer 5, a capture buffer 6, a coordinate conversion process means 7, a coordinate conversion table 8, a displaying buffer 9 and a drawing process means 11.

In this configuration, the process flows as follows. First, a switching process means 3 switches an image to be captured between an image captured by the first capturing device 1 and an image captured by the second capturing device 2 per a predetermined time period. The image is inputted by means of the image inputting means 4 into the capture buffer 5 or the capture buffer 6 as an image data. In accordance with the information in the coordinate conversion table 8, which has been created in advance, a combined image is created in the coordinate conversion process means 7 on the basis of the image data in the capture buffer 5 and the image data in the capture buffer 6. Specifically, the coordinate conversion table 8 stores information of an usable range related to the image captured by the first capturing device 1 and an usable range related to the image captured by the second capturing device 2, in order to regulate a borderline in the combined image. The created combined image is outputted into the displaying buffer 9, and after the drawing process, such as describing a locus of the vehicle on the combined image, is applied to the combined image by the drawing process means 11, the combined image is displayed on the displaying device 12. The arrows in FIG. 3 indicate directions in which the process proceeds.

A first embodiment of the vehicle surrounding monitoring device will be explained. A vehicle surrounding monitoring device of the first embodiment includes a first camera C1 as the first capturing device 1, a second camera C2 as the second capturing device 2. Specifically, the first camera C1 is attached to the vehicle at a left door mirror thereof, and the second camera C2 is attached to the vehicle at a left end portion of a front fender thereof, or at a left end of a front bumper thereof. More specifically, the first camera C1 is attached to the door mirror at a lower portion thereof so as to face front and downward, and the second camera C2 is attached to the front fender at a front end thereof so as to face front and downward. The first camera C1 captures a first image, and the second camera captures a second image. These images are processed by the image processing device 10 and displayed on a monitor (not shown) provided in the vehicle. A user of the vehicle can confirm information about the vehicle surrounding through the image displayed on the monitor.

Figure 1:
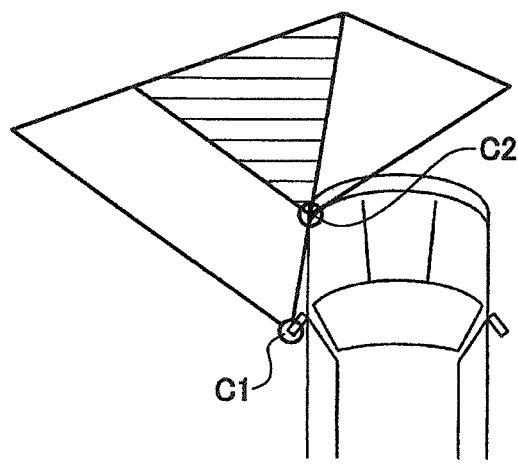
FIG. 1 illustrates an overlapped range between a range captured by a camera C1 and a range captured by a camera C2 according to a first embodiment of a vehicle surrounding monitoring device of the present invention.
Figure 2:
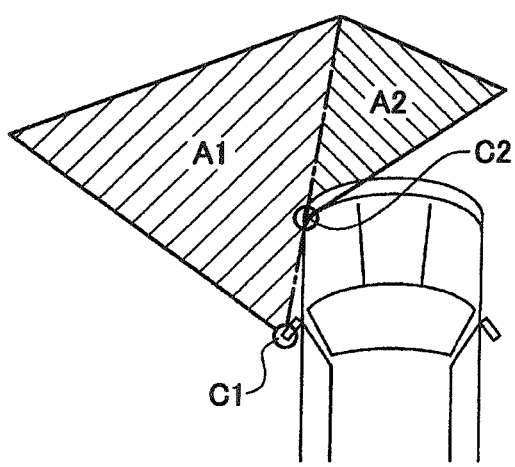
FIG. 2 illustrates an usable range of the range captured by the first camera C1 and an usable range of the range captured by the second camera C2 of the vehicle surrounding monitoring device illustrated in FIG. 1, and a borderline between these usable ranges.

In terms of a capturing angle of the camera, a capturing range of the first camera C1 overlaps on a capturing range of the second camera C2, and such overlapping range is illustrated by hatching in FIG. 1. If both the first image captured by the first camera C1 and the second image captured by the second camera C2, including the overlapping range, are displayed on the monitor, the overlapping range is included each of the first image of the first camera C1 and the second image of the second camera C2. Further, in the same manner as the prior art explained in the background of the invention, if an object exists within the overlapping range, the user may recognize that there is two different objects within the surroundings of the vehicle, or it becomes difficult for the user to recognize a positional relationship between the vehicle and the object through the confusing images. The vehicle surrounding monitoring device according to the present invention defines a borderline between the usable range of the first image captured by the first camera C1 and the usable range of the second image captured by the second camera C2 so as not to include a overlapping range therebetween as shown in FIG. 2. Thus, even if an object exists within the overlapping range, because the usable range of the first camera C1 does not overlap on the usable range of the second camera C2 by defining and providing the borderline between them, the object is included in either one of the usable range of the first camera C1 or the usable range of the second camera C2. Thus, the user can accurately recognize the number of the object, and it becomes easy for the user to recognize the positional relationship between the vehicle and the object.

Figure 4:
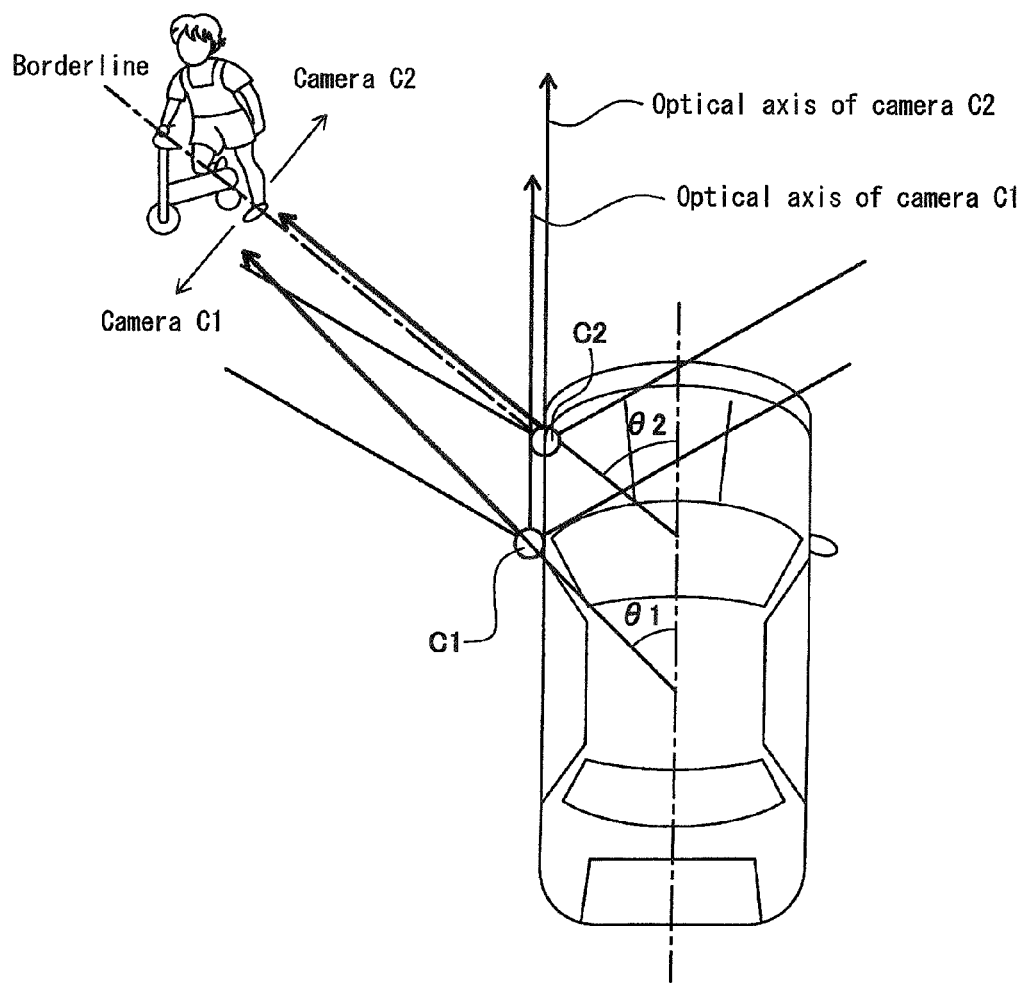
FIG. 4 illustrates capturing directions of the first camera C1 and the second camera C2 when the borderline is set at a random position.

Even when the borderline is defined, following phenomena may occur. Generally, when plural cameras capture the object from different directions, because the object is captured at different surfaces, the object may be shown in each of images in different shapes. In this configuration, if a borderline is defined randomly, and an object (a child in FIG. 4) exists upon the borderline as shown in FIG. 4, an angle θ1 between a line, which connects the first camera C1 and the object, and a central line of the vehicle width direction (a main axis of the vehicle) differs from an angle θ2 between a line, which connects the second camera C2 and the object, and a central line of the vehicle width direction (a main axis of the vehicle). In other words, a capturing direction in which the first camera C1 captures the object differs from a capturing direction in which the second camera C2 captures the object. Thus, even when the usable range of the first image captured by the first camera C1 and the usable range of the second image captured by the second camera C2 are divided by the borderline, because the object, which exists upon the borderline, is captured in different directions, the object in the combined image may not be presented as a complete figure, and user cannot recognized what the object is.

Thus, the vehicle surrounding monitoring device according to the present invention set the borderline so as to be identical to a straight line connecting the position of the first camera C1 and the position of the second camera C2 as shown in FIG. 2 and executes the image processing. Specifically, the borderline is set so as to be identical to a line connecting each of optical axes of the first camera C1 and the second camera C2 and each front end of the first camera C1 and the second camera C2. In the first embodiment, the leftward range relative to the borderline is set as a usable range A1 of the first image captured by the first camera C1, and the rightward range relative to the borderline is set as a usable range A2 of the second image captured by the second camera C2. The position of the first camera C1 and the position of the second camera C2 are set so as not includes a fender portion of the vehicle within the usable range A1 of the first image captured by the first camera C1.

Figure 5:
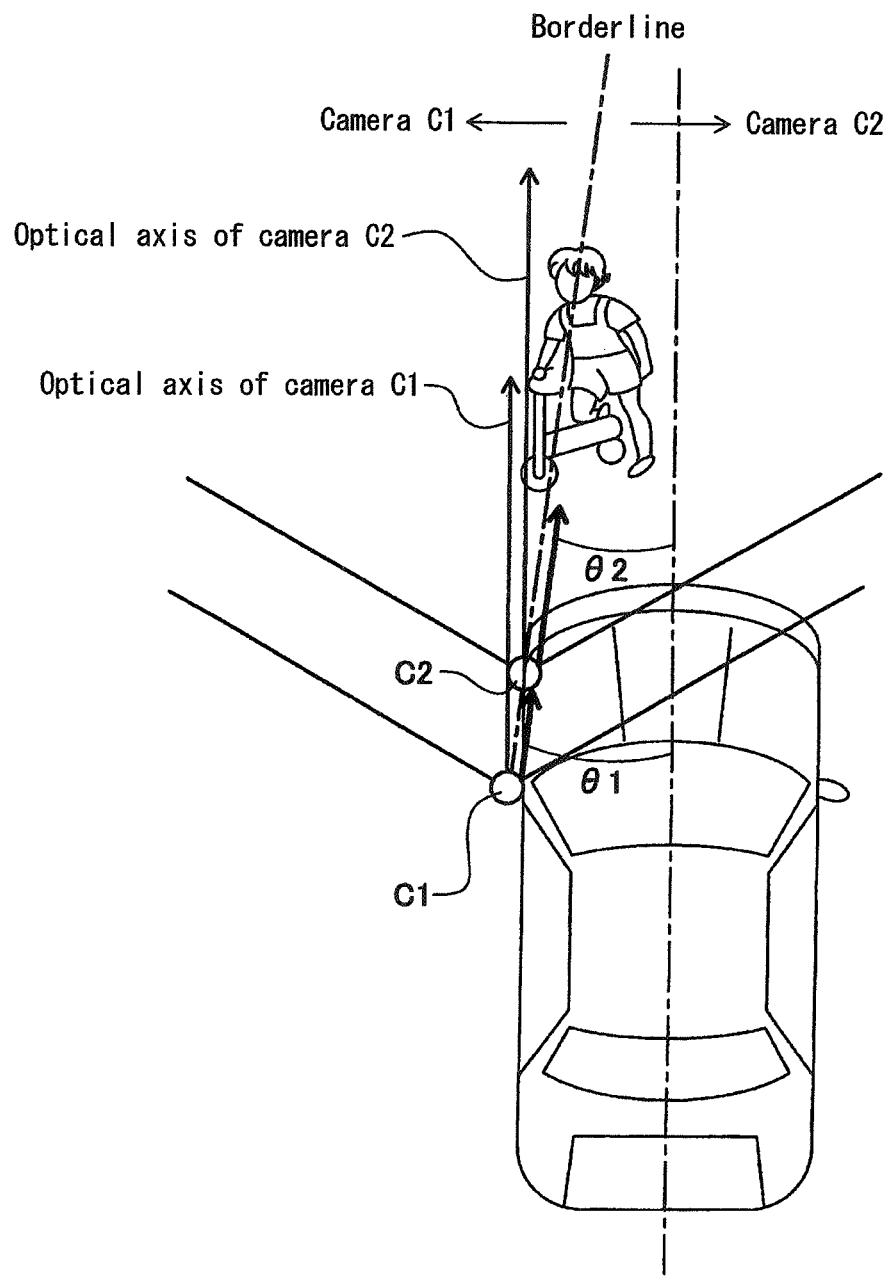
FIG. 5 illustrates capturing directions of the first camera C1 and the second camera C2 of the vehicle surrounding monitoring device illustrated in FIG. 1.

Thus, by defining the borderline as mentioned above, the angle θ1 between a line, which connects the first camera C1 and the object (a child in FIG. 5), and a central line of the vehicle width direction (a main axis of the vehicle) becomes identical to the angle θ2 between a line, which connects the second camera C2 and the object, and a central line of the vehicle width direction (a main axis of the vehicle). The capturing direction of the first camera C1 becomes identical to the capturing direction of the second camera C2, in other words, the first camera C1 and the second camera C2 can capture the object in the same direction. Thus, even when the usable range of the first image captured by the first camera C1 and the usable range of the second image captured by the second camera C2 are divided by the borderline, because the object, which exists upon the borderline, is captured in the same direction, the object appears as an approximate complete figure in the combined image, and the user can recognized information of the object, such as its shape, correctly to some degree. For example, when the cameras capture the object such as a child (a human) as illustrated in FIG. 5, the user can sufficiently recognized that the object is a child. The user can also recognize the positional relationship between the vehicle and the child accurately and easily. Thus, even when the child runs out in the road, the user can determine at once that the child is approaching toward the vehicle, as a result, the child can be prevented from being hit by the vehicle.

Further, according to a vehicle having a steering wheel on the right hand side of the vehicle, the left-front area, especially the left-downward of the front fender, can be out of the driver's view. Thus, in the present embodiment, the first camera C1 is provided at the left door mirror, and the second camera C2 is provided at the left of the front fender. In this configuration, the area being out of the driver's view can be captured by the first camera C1 and the second camera C2, and the captured image can be displayed on the displaying means such as a monitor. Thus, the user confirms whether or not a human exists in the area being out of the driver's view, or, when the vehicle is parallel parked on the road, the user monitors the right-front of the vehicle in order to pull the vehicle over to the edge as much as can.

According to the present invention, the vehicle surrounding monitoring device includes a first camera C1 provided at the side of the vehicle in order to capture a first image, a second camera C2 provided at front relative to the first camera C1 in order to capture a second image and a displaying means for displaying the first image and the second image in order to monitor the vehicle surrounding. The vehicle surrounding monitoring device further includes an image process means by which a borderline between the first image and the second image is defined in a combined image of the first image and the second image so as to be identical with a line connecting a position of the first camera C1 and the second camera C2. Thus, even when the capturing range of the first camera C1 overlaps the capturing range of the second camera C2, because only one of these overlapping areas is used and displayed on the displaying means, an object existing upon the borderline can be displayed seamlessly, and, because the object existing on the borderline is not duplicated in the displayed image, the user can recognize the number of the object correctly. Further, because the first image captured by the first camera C1 and the second image captured by the second camera C2 can be arrayed seamlessly in the displayed image, the user can confirm the positional relationship between the vehicle and the object correctly and easily.

According to the vehicle surrounding monitoring device, the first camera C1 and the second camera C2 are provided on the same side of the vehicle. Thus, these cameras capture the area being out of the user's view, and even when the object exists within such area, the object can be displayed on the displaying image. Thus, the user can confirm the positional relationship between the vehicle and the object existing in the area being out of the user's view correctly and easily.

Figure 6:
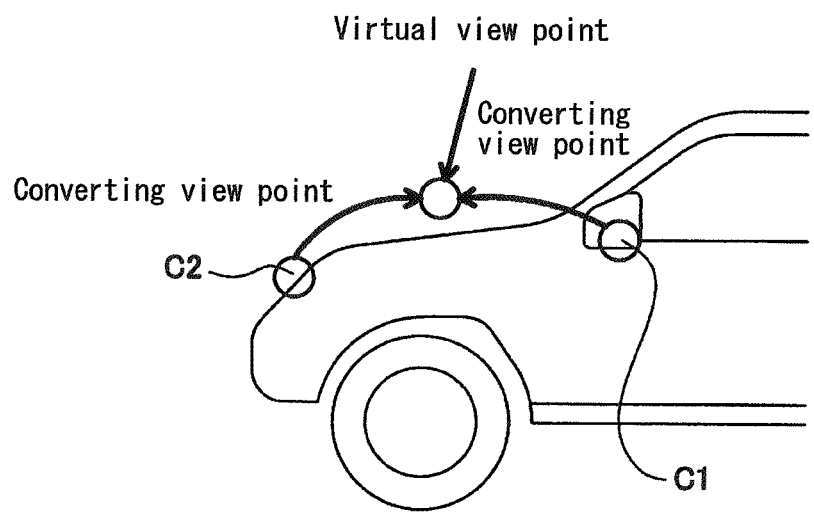
FIG. 6 illustrates a drawing in which the vehicle is seen from its side and a position of a virtual viewpoint is indicated when the vehicle is seen from side.
Figure 7:
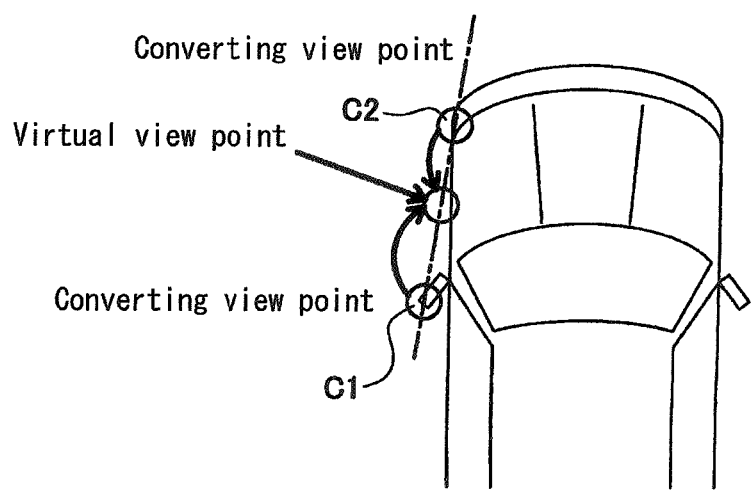
FIG. 7 illustrates a drawing in which the vehicle is seen from upper direction thereof and the position of the virtual viewpoint is indicated.
Figure 8:
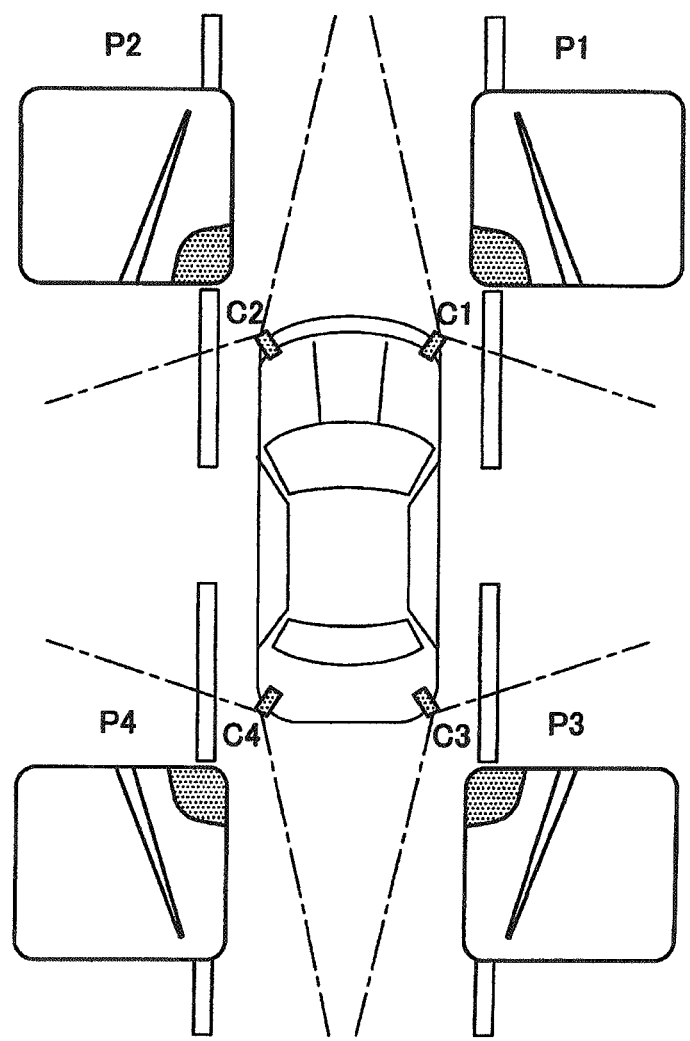
FIG. 8 illustrates a schematic view of a parking assist system disclosed in JP2000-168475A.
Figure 9:
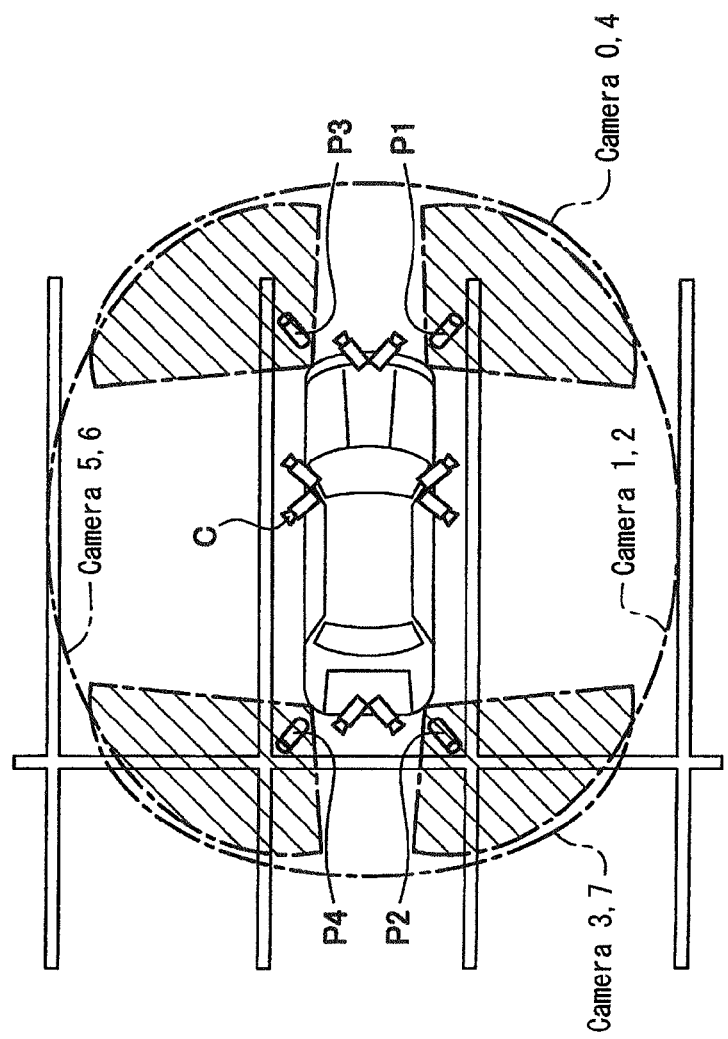
FIG. 9 illustrates a schematic view of a vehicle surrounding monitoring system disclosed in JP2002-019556A.
Figure 10:
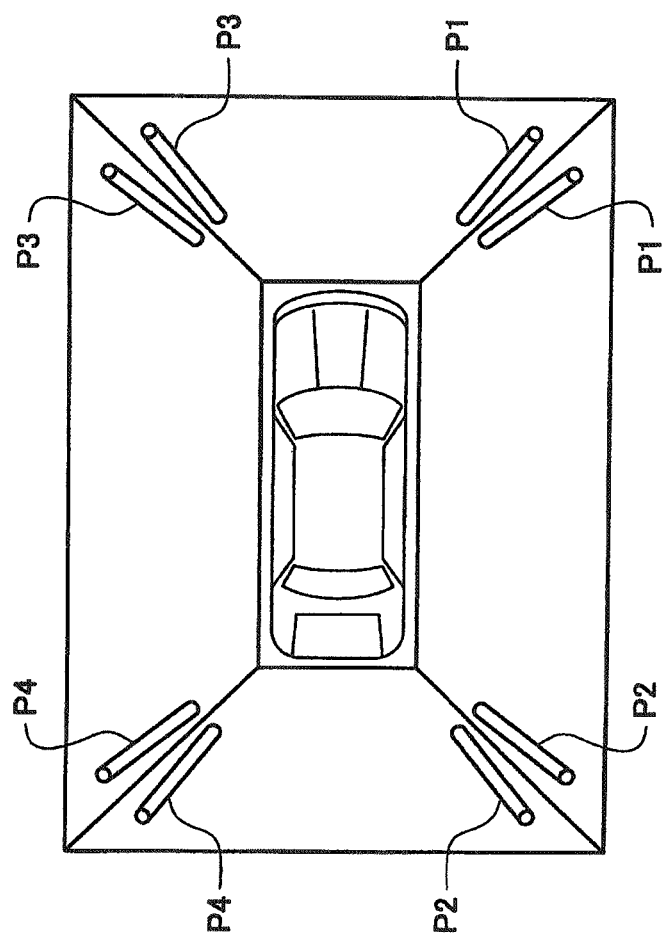
FIG. 10 illustrates an image displayed by the vehicle surrounding monitoring system disclosed in JP2002-019556A.
Figure 11:
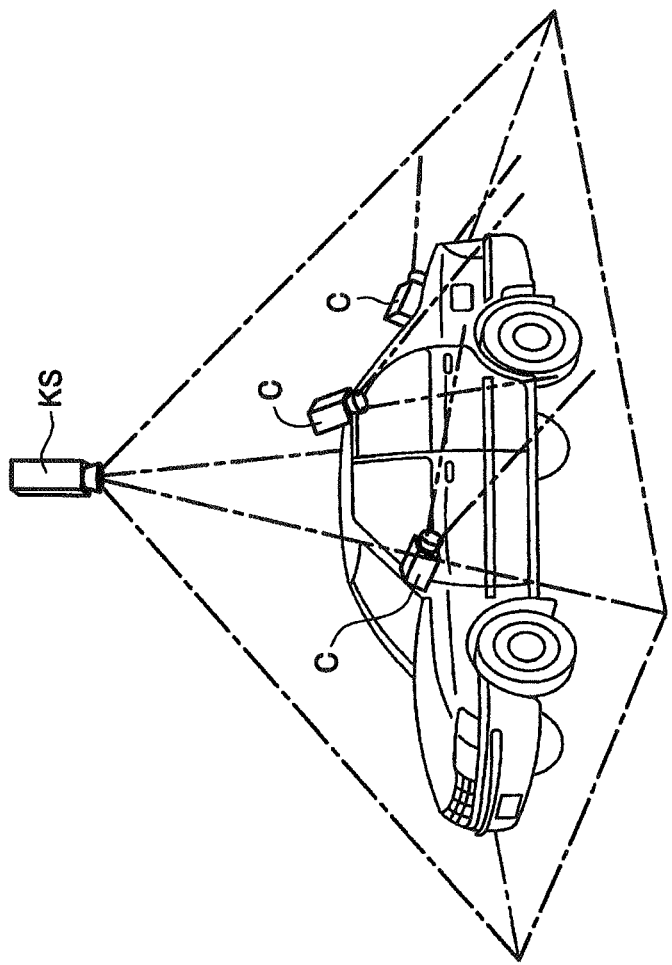
FIG. 11 illustrates a schematic view of a vehicle surrounding monitoring system disclosed in JP3300334C.

A second embodiment of the present invention will be explained. In the second embodiment, the vehicle surrounding monitoring device 2 is basically configured and provided in the same way as the first embodiment, however, the vehicle surrounding monitoring device 2 of the second embodiment includes a coordinate conversion process means 7 that converts each of a viewpoint of the first camera C1 and a viewpoint of the second camera C2 into a virtual viewpoint as shown in FIG. 2. Specifically, as shown in FIG. 7, which is seen from upper direction of the vehicle, the position of the virtual viewpoint is provided upon a solid line, which connects the position of the first camera C1 and the position of the second camera C2, and between the first camera C1 and the second camera C2. Further, as shown in FIG. 6, which is seen from the side of the vehicle, the virtual viewpoint is provided at the same height as that of the vehicle.

Thus, because the virtual viewpoint is provided upon the solid line, which connects the position of the first camera C1 and the position of the second camera C2, the object is captured from the single viewpoint. Thus, the object can be displayed seamlessly in the combined image, in which the first image captured by the first camera C1 and the second image captured by the second camera C2 are combined. The user of the vehicle can confirm the number of the object correctly, and also confirms the positional relationship between the vehicle and the object correctly and easily. Further, because the virtual viewpoint is provided between the first camera C1 and the second camera C2, the area in the vicinity of the vehicle can be captured, so that an object existing in an area being out of view of the user can be captured, and thus the user can confirm the positional relationship between the vehicle and the object correctly and easily. The virtual viewpoint may be provided at an approximate central position between the first camera C1 and the second camera C2 in order to confirm the object correctly and easily, and also confirm the positional relationship between the vehicle and the object correctly and easily.

Thus, the vehicle surrounding monitoring device according to the second embodiment includes a virtual viewpoint provided on a solid line in addition to the configuration described in the first embodiment, and the displaying means displays an image in which each of the first image and the second image is captured from the virtual viewpoint. Thus, even when the capturing range of the first camera C1 overlaps the capturing range of the second camera C2, because only one of these overlapping areas is used and displayed on the displaying means, an object existing upon the borderline can be displayed seamlessly, and, because the object existing on the borderline is not duplicated in the displayed image, the user can recognize the number of the object correctly. Further, according to the vehicle surrounding monitoring device of the second embodiment, because the first image captured by the first camera C1 and the second image captured by the second camera C2 can be arrayed seamlessly in the displayed image, the user can confirm the positional relationship between the vehicle and the object correctly and easily. Furthermore, because the object is captured from a single virtual viewpoint, the object is displayed seamlessly in the combined image. The user of the vehicle can confirm the number of the object correctly, and also confirms the positional relationship between the vehicle and the object correctly and easily. Furthermore, because the area being out of the user's view can be captured by the cameras from the virtual viewpoint, the user of the vehicle can confirm the object existing in the area being out of the user's view correctly and easily, and also confirms the positional relationship between the vehicle and the object correctly and easily.

Furthermore, according to the vehicle surrounding monitoring device, because the virtual viewpoint is provided at the approximately central position between the position of the first camera C1 and the position of the second camera C2, even if the object exists at the area in the vicinity of the central position between the first camera C1 and the second camera C2, the user of the vehicle can confirm the number of the object correctly, and also confirms the positional relationship between the vehicle and the object correctly and easily. Furthermore, because the area being out of the user's view can be captured by the cameras from the virtual viewpoint, the user of the vehicle can confirm the object existing in the area being out of the user's view correctly and easily, and also confirms the positional relationship between the vehicle and the object correctly and easily.

The present invention is not limited to only the first embodiment and the second embodiment, and may be vary.

A third embodiment of the vehicle surrounding monitoring device will be explained in accordance with the drawings attached hereto. The vehicle surrounding monitoring device of the third embodiment includes the image process means described in the first embodiment and the second embodiment, and further includes a highlighting process means and a drawing process means and the like. FIG. 12 illustrates a schematic view indicating a configuration of the surrounding monitoring system 101. The surrounding monitoring system 101 includes a vehicle 102, a first camera 104 (e.g., first capturing device), a second camera 103 (e.g. second capturing device), a display 105 (e.g., displaying means), a speaker 106, a surrounding monitoring ECU (electric control unit) 107, a yaw rate sensor 108 (e.g., traveling direction detecting means), a right-rear wheel speed sensor 109 (e.g., vehicle speed detecting means), a left-rear wheel speed sensor 110 (e.g., vehicle speed detecting means). In the third embodiment, the surrounding monitoring ECU 107 configures the vehicle surrounding monitoring device.

The surrounding monitoring system 101 employs a stereo camera type style, by which an image of the front area of a passenger seat is captured by the first camera 104 and the second camera 103. The first camera 104 is attached at the front end of the front fender at the passenger seat side in a manner where its optical axis faces frontward and downward. The second camera 103 is attached at an under surface of a door mirror 111, which is provided at the passenger seat side in a manner where its optical axis faces frontward and downward. Each of the first camera 104 and the second camera 103 includes a wide-angle lens in order to capture an angle of 140 degree in a horizontal direction, and capture within 30 meter ahead. In the third embodiment, the first camera 104 is attached to the front fender, however, it may be attached to a front bumper alternatively.

The display 105 is assembled to a center console provided in the vehicle 102 or a panel surface provided in the vehicle 102. For example, on the display 105, an first image captured by the first camera 104 and a second image captured by the second camera 103 are displayed, furthermore, a highlighting frame W is displayed so as to be superposed on the first image captured by the first camera 104 and the second image captured by the second camera 103. The speaker 106 is also used as a car stereo equipment of the vehicle 102. An alert and a warning announce are outputted as an audible indication for the driver by means of the speaker 106.

The surrounding monitoring ECU 107 detects an object in the first image captured by the first camera 104 and the second image captured by the second camera 103, and the object is displayed on the display 105 in a manner where the object is enclosed in the highlighting frame W. The configuration of the surrounding monitoring ECU 107 will be explained in detail later. The yaw rate sensor 108 is attached inside an instrument panel in order to detect a yaw rate and output the detected yaw rate to the surrounding monitoring ECU 107. Each of the right-rear wheel speed sensor 109 and the left-rear wheel speed sensor 110 includes an active wheel speed sensor attached to the wheel of the vehicle 102 in order to detect the rotational speed of the wheel and output the speed as a speed signal to the surrounding monitoring ECU 107.

Figure 13:
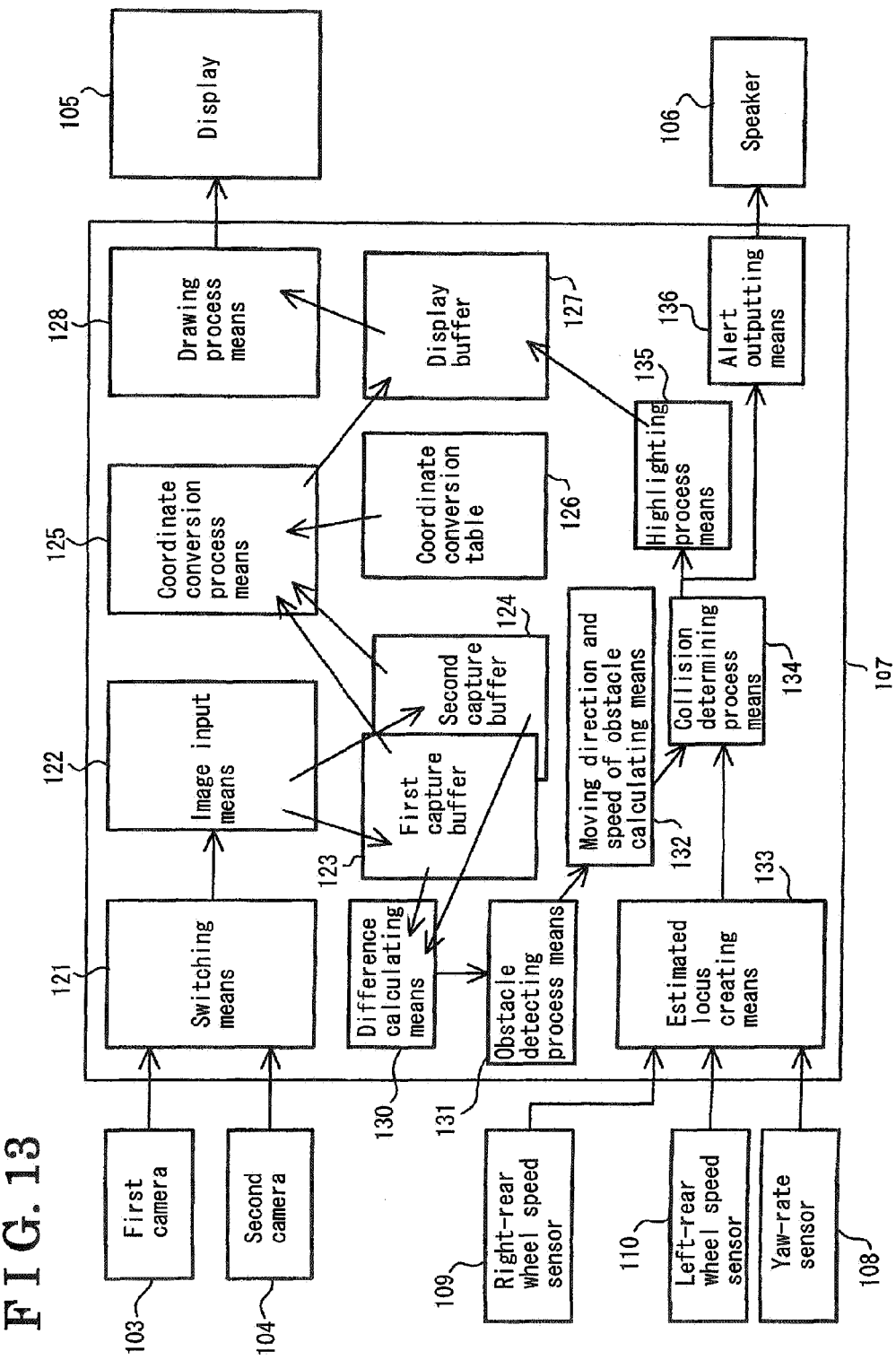
FIG. 13 illustrates a schematic view of the configuration of a surrounding monitoring ECU of the vehicle surrounding monitoring device illustrated in FIG. 12.

The configuration of the surrounding monitoring ECU 107 will be explained. FIG. 13 illustrates a block diagram indicating the configuration of the surrounding monitoring ECU 107. Arrows in FIG. 13 indicate directions of the process in the surrounding monitoring ECU 107. As shown in FIG. 13, the surrounding monitoring ECU 107 includes a switching means 121, an image input means 122, a coordinate conversion process means 125 and a drawing process means 128. In this configuration, the surrounding monitoring ECU 107 combine the first image captured by the first camera 104 and the second image captured by the second camera 103, and the combined image is displayed as a combined image on the display 105. The switching means 121 switches image to be captured between the first image captured by the first camera 104 and the second image captured by the second camera 103 per a predetermined time period. The images are inputted by the image input means 122. The image input means 122 stores the first image captured by the first camera 104 into a first capture buffer 123, and the image input means 122 also stores the second image captured by the second camera 103 into a second capture buffer 124. Thus, the first image and the second image are stores so as to be separated. The coordinate conversion process means 125 reads the images from the first capture buffer 123 and the second capture buffer 124, and creates a combined image on the basis of the images in accordance with information of a coordinate conversion table 126. The information in the coordinate conversion table 126 includes an usable range of the first image captured by the first camera 104 and an usable range of the second image captured by the second camera 103, and the information is used for regulating a borderline in the combined image. The combined image is inputted by a display buffer 127. The drawing process means 128 reads the combined image in the display buffer 127 and executes a drawing process, for example applying a highlighting frame on the combined image. Then the combined image is outputted to the display 105.

The surrounding monitoring ECU 107 also includes a difference calculating means 130, an obstacle detecting process means 131, a moving direction and speed of obstacle calculating means 132, an estimated locus creating means 133, a collision determining process means 134, a highlighting process means 135 and the display buffer 127, and by means of the drawing process means 128, the highlighting frame by which the obstacle is enclosed is created, and such highlighting frame is superposed on the combined image.

The difference calculating means 130 inputs the first image from the first capture buffer 123 and the second image from the second capture buffer 124 and applies a matching process. On the basis of a difference of parallax between the first image and the second image, a solid object on the road surface is detected. In this way, because the difference calculating means 130 detects the solid object, which can be a basis of the obstacle detecting process, as mentioned above, a position and a shape of the solid object need to be detected accurately. It may be difficult to detect the solid object accurately because an overlapping range V3, within which a first capturing range V1 of the first camera 104 overlaps on a second capturing range V2 of the second camera 103, is relatively narrow.

Figure 14:
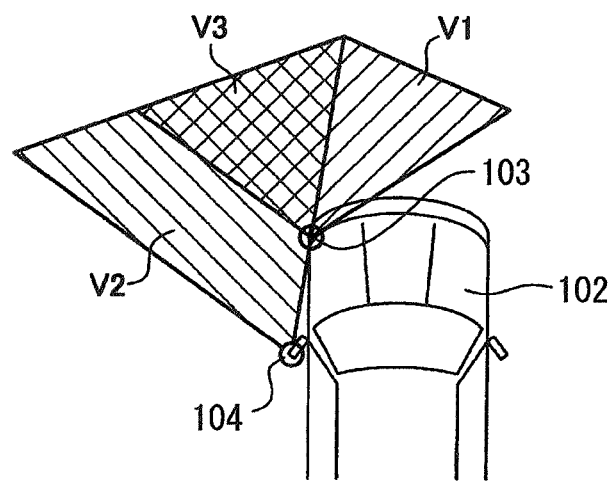
FIG. 14 illustrates a diagram indicating a range captured by a first camera and a range captured by a second camera.

FIG. 14 illustrates a diagram which indicates the capturing range of the first camera 104 and the capturing range of the second camera 103. Each of the first camera 104 and the second camera 103 has a wide angle of view such as 140 degree, however, because the second camera 103 is provided at the door mirror, and the second image includes the vehicle 102, the second camera 103 can capture the surrounding of the vehicle within a second range V2. The second range V2 overlaps on a first range V1 at an overlapping range V3. The difference calculating means 130 can detect the solid object within the overlapping range V3.

Figure 15:
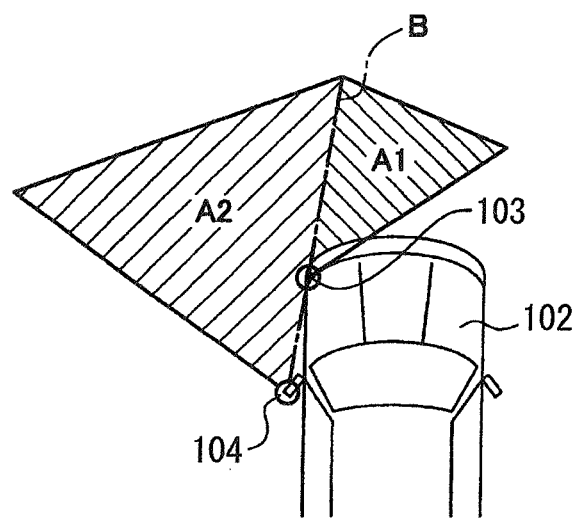
FIG. 15 illustrates a diagram indicating an usable range of the range captured by the first camera C1 and an usable range of the range captured by the second camera C2 of the vehicle surrounding monitoring device illustrated in FIG. 12, and a borderline between these usable ranges.

FIG. 15 illustrates a diagram which indicates an usable range A1 in the first range captured by the first camera 104, an usable range A2 in the second range captured by the second camera 103 and a borderline B regulated between the usable range A1 and the usable range A2. As shown in FIG. 5, the first image captured by the first camera 104 and the second image captured by the second camera 103 are combined on the basis of the borderline B. In other words, the borderline B is set so as to be identical to a straight line that connects an optical axis of the first camera 104, an optical axis of the second camera 103 and the each front end of the first camera 104 and the second camera 103. The usable range A1 of the first image captured by the first camera 104 is set at the right portion of the first range V1 relative to the borderline B, and the usable range A2 of the second image captured by the second camera 103 is set at the left portion of the second range A2 relative to the borderline B, and the coordinate conversion process means 125 converts an image within the usable range A1 and the usable range A2. Thus, if the first image captured by the first camera 104 and the second image captured by the second camera 103 have the same pattern, the solid object is displayed in an accurate shape in the combined image, in which the first image within the usable range A1 and the second image within the usable range A2 are combined.

Figure 16:
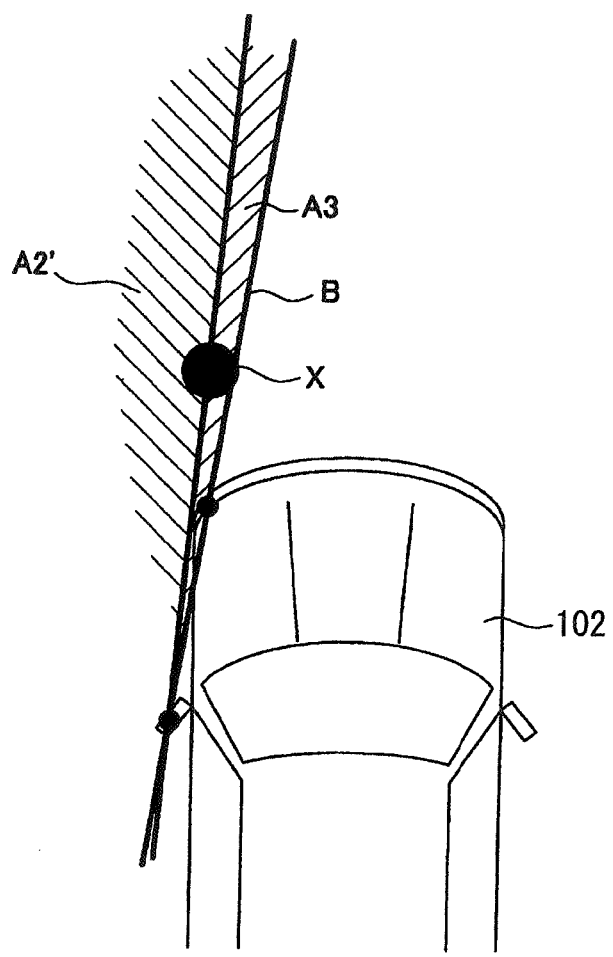
FIG. 16 illustrates a diagram indicating a relationships between a solid object and the captured ranges.

FIG. 16 illustrates a diagram which indicates a positional relationship between a solid object X and the capturing range. As mentioned above, the capturing images are separated by the borderline B into the usable range A1 and the usable range A2, however, a part of the fender of the vehicle 102 is captured in the second image captured by the second camera 103 within the usable range A2, and if such image is combined into the image within the usable range A1 in order to create a combined image, a part of the vehicle 102 captured within the usable range A2 is shown at the central portion of the image displayed on the display 105, and thus it becomes difficult for the user to confirm the object in the surrounding of the vehicle. Thus, the usable range A2 can be modified to the usable range A2' so that the surrounding monitoring ECU 107 cannot capture the fender of the vehicle 102. Thus, when the usable range A2 is modified to the usable range A2', because a blank range A3 is provided between the usable range A2' and the borderline B, a part of the first image, which corresponds to the blank range A3, is used for the blank range A3. However, because the position of the first camera 1 differs from the position of the second camera 103, a viewpoint of the first camera 104 also differs from a viewpoint of the second camera 103 in a longitudinal direction, a width direction and a vertical direction of the vehicle. Thus, each of the first camera 104 and the second camera 103 captures the solid object X in a different direction, as a result, a position and a shape of the solid object X cannot be displayed on the display 105 accurately.

Figure 17:
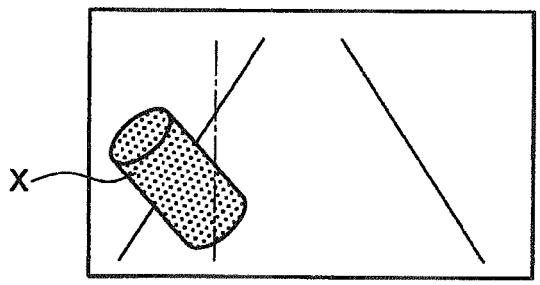
FIG. 17A illustrates an image captured by the first camera.
FIG. 17B illustrates an image captured by the second camera.
FIG. 17C illustrates an combined image of FIG. 17A and FIG. 17B.
Figure 17:
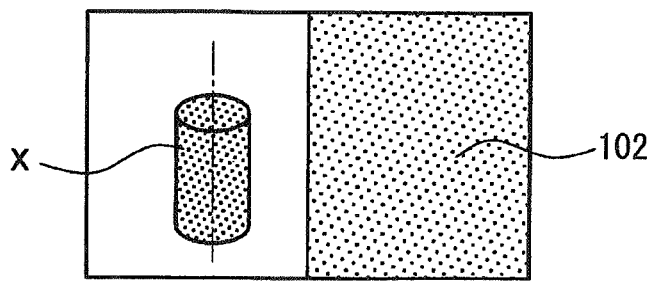
Figure 17:
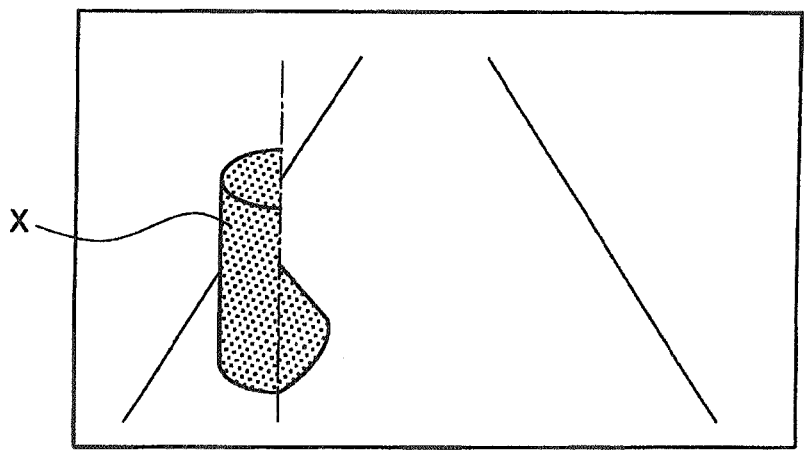

FIG. 17A illustrates a diagram indicating the first image captured by the first camera 104, which is provided as shown in FIG. 16, FIG. 17B illustrates a diagram indicating the second image captured by the second camera 103, which is provided as shown in FIG. 16, and FIG. 17C illustrates a diagram indicating the combined image of the first image and the second image. Because the first camera 104 captures the solid object X at a position, which is front and right relative to the second camera 103, the solid object X is captured in the first image so as to be lean in left direction as shown in FIG. 17A. On the other hand, because the second camera 103 captures the solid object X from approximately confrontive position thereof, the solid object X is captured in the second image so as to be upright relative to the road surface as shown in FIG. 17B. In this configuration, when the first image within the first usable range A1 and the second image within the second usable range A2 are combined in order to create the combined image, the solid object X is shown in an incomplete shape in the combined image as shown in FIG. 17C. Even when a matching process is applied to the combined image, the shape and the position of the solid object X may not be shown accurately. Thus, the first camera 104 is provided closer to the fender of the vehicle 102 in order to narrow the second usable range A2. Thus, the difference between the angle of the solid object X in the first image and the angel of the solid object X in the second image can be reduced to some extent, so that the solid object X in the combined image can be shown accurately to some extent. In the third embodiment, the first camera 104 is attached to a bottom portion of a supplemental mirror 112 of the vehicle 2 such as a four-wheel-drive car.

Figure 18:
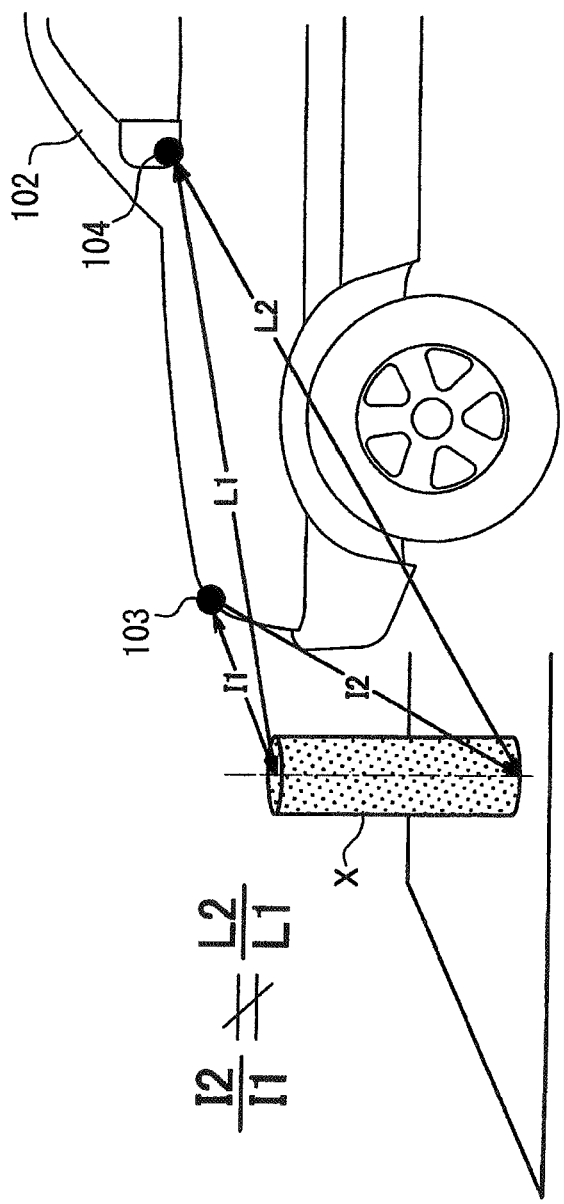
FIG. 18 illustrates a diagram explaining distances between each camera and the solid object illustrated in FIG. 16.

FIG. 18 illustrates a diagram which explains a difference between a distance, which is between the first camera 104 and the solid object X, and a distance, which is between the second camera 103 and the solid object X. Because the position of the first camera 104 differs from the position of the second camera 103 in a longitudinal direction of the vehicle and a vertical direction of the vehicle, a distance I1, a distance L1, a distance I2 and a distance L2 vary as shown in FIG. 18. Specifically, the distance I1 is a distance between the first camera 104 and a top portion of the solid object X, the distance L1 is a distance between the second camera 103 and the top portion of the solid object X, the distance I2 is a distance between the first camera 104 and a bottom portion of the solid object X and the distance L2 is a distance between the second camera 103 and the bottom portion of the solid object X. A reduced scale of I2/I1 of the first camera 104 is not identical to a reduced scale of L2/L1 of the second camera 103. In this configuration, when the difference calculating means 130 sets a reduced scale on the basis of a level of the road surface in order to detect the solid object X on the road surface, the solid object X is shown in each of the first image and the second image in a different way as shown in FIG. 19A and FIG. 19B.

Figure 19:
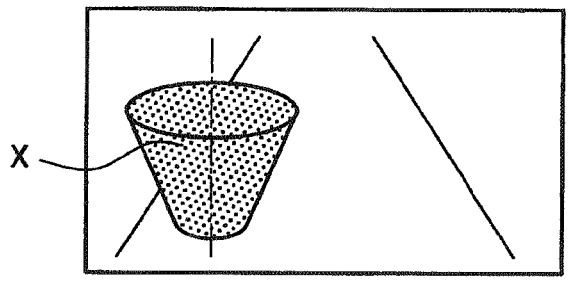
FIG. 19A illustrates an image diagram of the image of the solid object illustrated in FIG. 16 captured by the first camera.
FIG. 19B illustrates an image diagram of the image of the solid object illustrated in FIG. 16 captured by the second camera.
Figure 19:
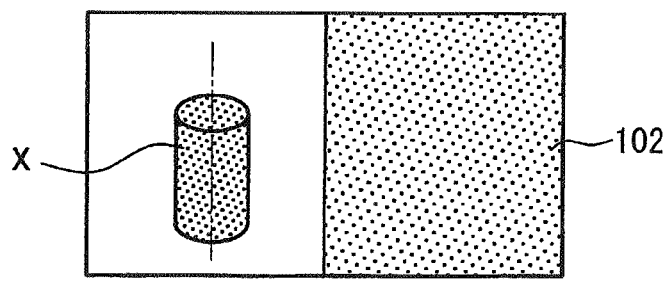

More specifically, FIG. 19A illustrates a first image captured by the first camera 104, which is provided as shown in FIG. 16; FIG. 19B illustrates a second image captured by the second camera 103, which is provided as shown in FIG. 16. Because the first camera 104 captures the solid object X at a close position in a downward direction, the solid object X is shown in the first image in a manner where it gradually enhanced toward the top portion thereof as shown in FIG. 19A. On the other hand, because the second camera 103 captures the solid object X at a distance position, the solid object X is shown in the second image approximately correctly as shown in FIG. 19B. In this case, when the first image within the first usable range A1 and the second image within the second usable range A2 (or within the usable range A2') are combined, the shape and the position of the solid object X may not be shown accurately in the combined image. Even when a matching process is applied to the combined image, the shape and the position of the solid object X may not be shown accurately. Thus, if a difference between a reduced scale on the basis of the height of the solid object and a receded scale on the basis of the road surface is greater than a predetermined value, the coordinate conversion process means 125 and the difference calculating means 130 correct the first image on the basis of the reduced scale relative to a height direction of the solid object X, not the road surface, in order to detect the solid object X.

Figure 20:
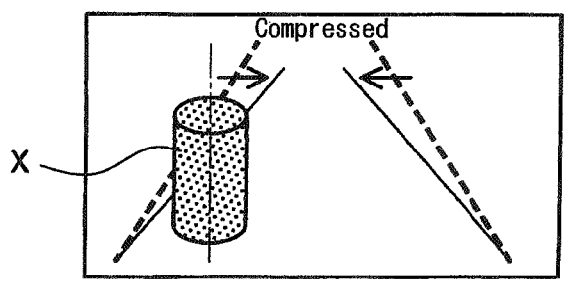
FIG. 20A illustrates a corrected image diagram of the image of the solid object illustrated in FIG. 16 captured by the first camera.
FIG. 20B illustrates a corrected image diagram of the image of the solid object illustrated in FIG. 16 captured by the first camera.
Figure 20:
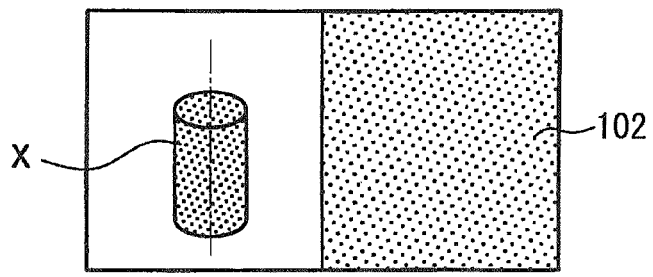

FIG. 20A illustrates a diagram indicating a corrected first image captured by the first camera 104, FIG. 20B illustrates a diagram indicating a corrected second image captured by the second camera 103. When the first image is corrected on the basis of the reduced scale relative to a height direction of the solid object X, the first image is compressed in the height direction of the solid object X as shown in FIG. 20A. Thus, a pattern of the solid object X shown in the corrected first image shown in FIG. 20A gets close to a patter of the solid object X shown in the second image shown in FIG. 20B. In this configuration, when the difference calculating means 130 calculates the difference after changing the reduced scale, the level of the mismatching can be reduced; as a result, the level of the accuracy for detecting the solid object can be enhanced.

The calculated result of the difference calculating means 130 is outputted to the obstacle detecting process means 131, which detects a possible obstacle, which may become an obstacle, from the detected solid objects. The obstacle in this embodiment is defined as a solid object that interrupts the traveling of the vehicle 102, and such obstacle is defined for each vehicle type because a vehicle height, a vehicle width or a difference between a truck of the front-inner wheel and a truck of the rear-inner wheel, while the vehicle make a turn, could differ depending on each vehicle type. In this embodiment, the vehicle 102 is a four-wheel drive car, and the obstacle detecting process means 131 detects a solid object, whose height is 20 cm or higher, as a possible obstacle. The detected result of the obstacle detecting process means 131 is outputted into the moving direction and speed of obstacle calculating means 132.

When an obstacle moves from the overlapping range V3, at which the first image captured by the first camera 104 overlaps on the second image captured by the second camera 103, the obstacle detecting process means 131 cannot recognize the obstacle as a solid object, as a result, such solid object may not be shown in the displayed image so as to be enclosed by a highlighting frame W. Thus, the obstacle detecting process means 131 detects the solid object, even when it exists out the overlapping range V3 as a possible obstacle. In other words, an out shape of the obstacle may not vary widely, and it is captured by the first camera 104 and the second camera 103 in a same image pattern. Thus, the obstacle detecting means 131 has created a similar shape on the basis of an image pattern of a solid object detected as a obstacle in past time, and the obstacle detecting means 131 determines whether or not the image pattern, which is similar to the created similar shape, exists in the first image captured by the first camera 104 and the second image captured by the second camera 103. When the obstacle detecting means 131 detects an image pattern that is similar to the similar shape, the detected image pattern is also detected as a possible obstacle, and such possible obstacle is outputted to the moving direction and speed of obstacle calculating means 132.

The moving direction and speed of obstacle calculating means 132 stores the possible obstacle detected by the obstacle detecting means 132 at predetermined numbers, and on the basis of the stored results, the moving direction and speed of obstacle calculating means 132 determines a speed and a direction of the movement of the possible obstacle. In other words, the moving direction and speed of obstacle calculating means 132 predicts an estimated traveling locus of the possible obstacle. The detected speed and direction is output to the collision determining process means 134.

On the other hand, the estimated locus creating means 133 input a yaw rate from the yaw rate sensor 108 and wheel speeds from the right-rear wheel speed sensor 109 and the left-rear wheel speed sensor 110 in order to estimate an estimated locus on which the vehicle 102 will travel. The estimated locus creating means 133 outputs the estimated locus to the collision determining process means 134.

The collision determining process means 134 determines whether or not the possible obstacle on the estimated traveling locus is an obstacle. Generally, a possibility that the possible obstacle detected out of the estimated traveling locus collides with the vehicle 102 is low. If such possible obstacle, which is not existing on the estimated traveling locus, is considered as an obstacle and displayed on the display 105 with a highlighting frame, or outputting an alarm, the driver may be confused. Thus, the collision determining process means 134 compares the estimated traveling locus estimated by the moving direction and speed of obstacle calculating means 132 to the estimated locus inputted from the estimated locus creating means in order to determine whether or not the possible obstacle will exist on the estimated locus after a predetermined time passes (in this embodiment, one second later). If it is determined that the possible obstacle will not exist on the estimated locus one second later, the collision determining process means 134 wait until next process. If it is determined that the possible obstacle will exist on the estimated locus one second later, the obstacle data including a shape and a position thereof is outputted to the highlighting process means 135.

Figure 21:
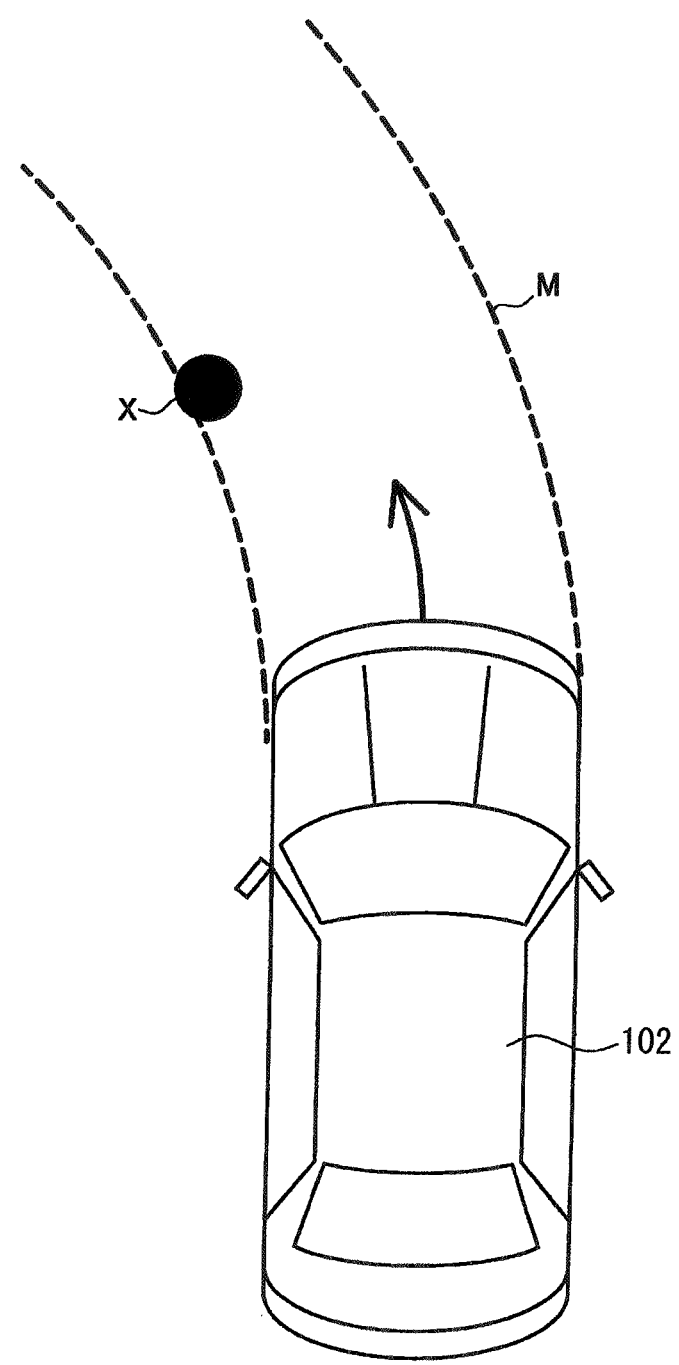
FIG. 21 illustrates a diagram indicating how the vehicle approaches to an obstacle.

FIG. 21 illustrates a diagram indicating how the vehicle approaches to the obstacle. When a possible obstacle X stops on an estimated locus M, because a possibility that the vehicle 102 collides with the possible obstacle X is high, the collision determining process means 134 determines the possible obstacle X as an obstacle X, and data of the obstacle X is outputted to the highlighting process means 135.

Figure 22:
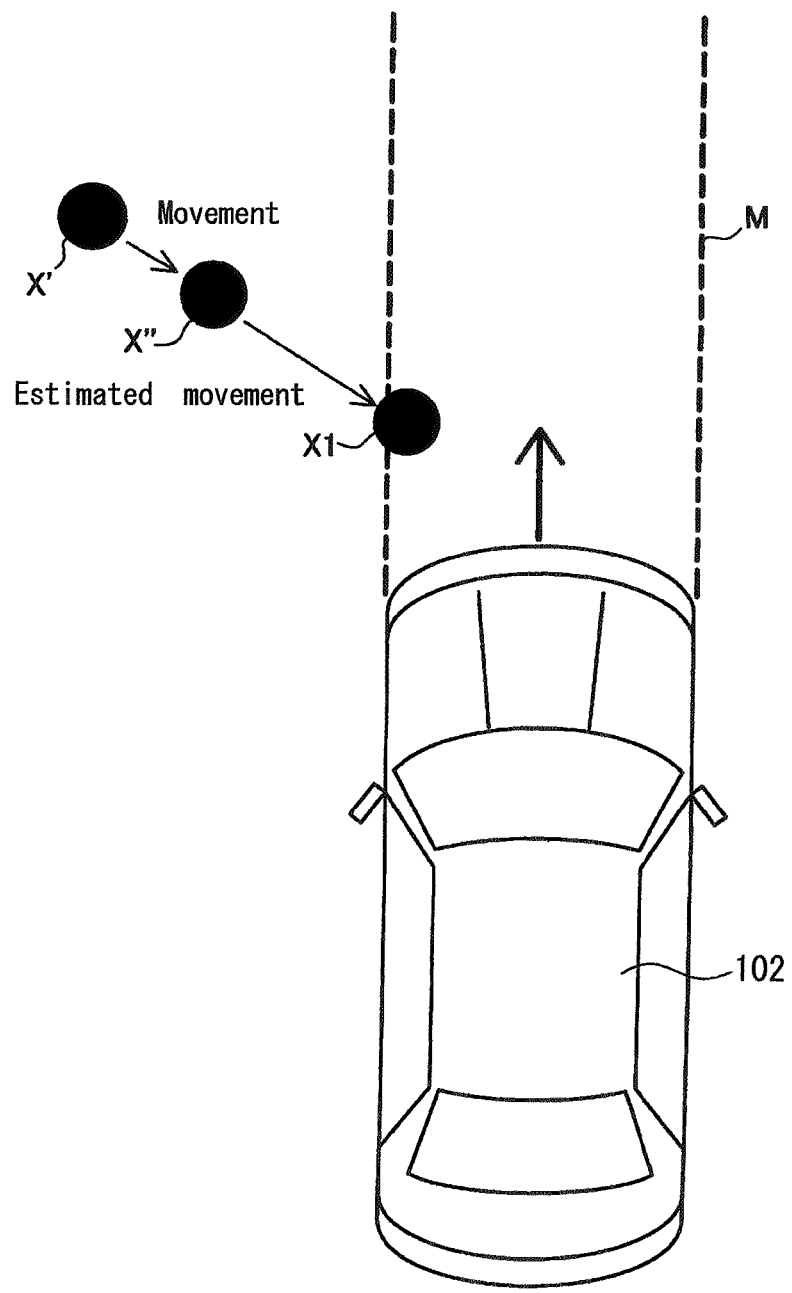
FIG. 22 illustrates a diagram indicating how the obstacle approaches to the vehicle.

FIG. 22 illustrates a diagram indicating how the obstacle approaches the vehicle. When a possible obstacle X moves from a position X' to a position X", and the it is determined that the possible obstacle X will travel to a position X1 after one second so as to enter within the estimated traveling locus M, and then the collision determining process means 134 determines the possible obstacle X as an obstacle X, and data of the obstacle X is outputted to the highlighting process means 135.

After the highlighting process means 135 inputs the data of the obstacle detected from the collision determining process 134, the highlighting process means 135 creates a highlighting frame W in order to enclose the obstacle, which is mentioned by the data. A frame data of the highlighting frame W is outputted to the display buffer 127. The highlighting frame W is formed so as to enclose an outer edge of the obstacle in order to indicate the position of the obstacle clearly. The drawing process means 128 reads the combined image stored in the display buffer 127 and the highlighting frame W. The combined image to which the highlighting frame W is applied is displayed on the display 105.

It is more useful for the driver if the positional relationship between the obstacle and the vehicle is clearly indicated on the display 105. When the vehicle 102 is shown in the first image captured by the first camera 104 and the second image captured by the second camera 103, position of the vehicle 102 in the combined image can be specified in the first image and the second image. In this case, when the first image captured by the first camera 104 is combined to the second image captured by the second camera 103 in order to create the combined image, in which the image of the vehicle 102 is shown, because a tire of the vehicle 102 may appear in front of the bumper when the vehicle 102 make a turn. Thus, the surrounding monitoring ECU 107 memories an icon of the vehicle 102 seen form obliquely behind in the coordinate conversion table 126 in advance, and the surrounding monitoring ECU 107 displays an icon J, which is memorized in the coordinate conversion table 126, on the combined image at a position of the vehicle 102 is detected in the first image and the second image by the coordinate conversion process means 125.

Further, even when the obstacle is enclosed by the highlighting frame W on the display 105, the driver may miss the existence of the obstacle. Thus, collision determining process means 134 outputs an obstacle detecting signal to the alert outputting means 136 when the collision determining process means 134 determines that there is an obstacle and the vehicle 102 may collide with the obstacle. Thus, the drawing process means 128 displays the highlighting frame W on the combined image, at the same time, the alert or a warning announce is outputted from the speaker 106 in order to let the driver know the existence of the obstacle.

Figure 23:
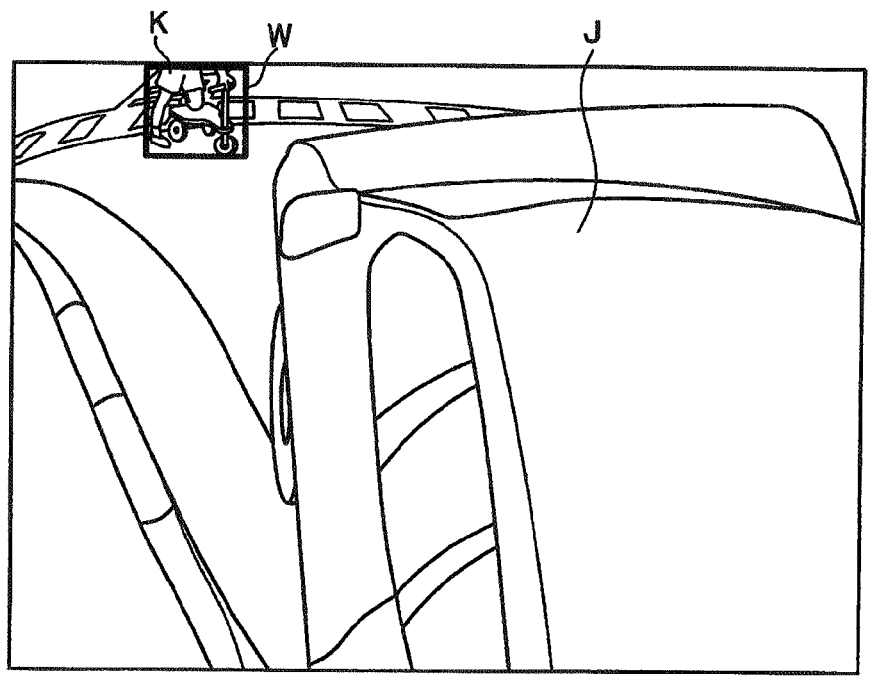
FIG. 23 illustrates a diagram of the image displayed on a displaying means when a child is detected as an obstacle.

An actuation of the surrounding monitoring system 101 of the present invention will be explained in reference to an example. First, an actuation of the surrounding monitoring system 101 for detecting a child K riding on a carriage will be explained. This is an example of a case for detecting an obstacle that approaches to the vehicle 102. FIG. 23 illustrates a displayed image when the child K is detected as an obstacle. When the vehicle 102 makes a left turn at an intersection where the child K crossing a pedestrian crossing, the child K is detected as a solid object by the difference calculating means 130. Because the height of the child K is higher than 20 cm, the obstacle detecting process means 131 recognized the child K as a possible obstacle. Because the child K exists on the estimate locus when the vehicle 102 is making a left turn, the collision determining process means 134 determines that the child K as an obstacle. Then, the highlighting frame W is created, and the drawing process means 128 draws the highlighting frame W on the combined image displayed on the display 105. At the same time, speaker 106 outputs an alert such as "peep-peep" sound and a warning announce in order to let the driver know the existence of the obstacle. On the combined image, the icon J of the vehicle 102 seen from an obliquely behind is displayed, so that the driver can confirm the positional relationship between the child K enclosed in the highlighting frame W and the vehicle 102 represented by the icon J on the display 105.

Then, even when the child K crosses the pedestrian crossing so as to be out of the overlapping range V3 between the first image captured by the first camera 104 and the second image captured by the second camera 103, because a similar shape of the child K is created on the basis of the image of the child K detected by the obstacle detecting process means 131, the obstacle detecting process means 131 can search an image, which is similar to the created similar shape, in the first image captured by the first camera 104 and the second image captured by the second camera 103, and confirm the image as an possible obstacle. Thus, the child K can be enclosed by the highlighting frame W even when the child K moves out of the overlapping range V3.

Figure 24:
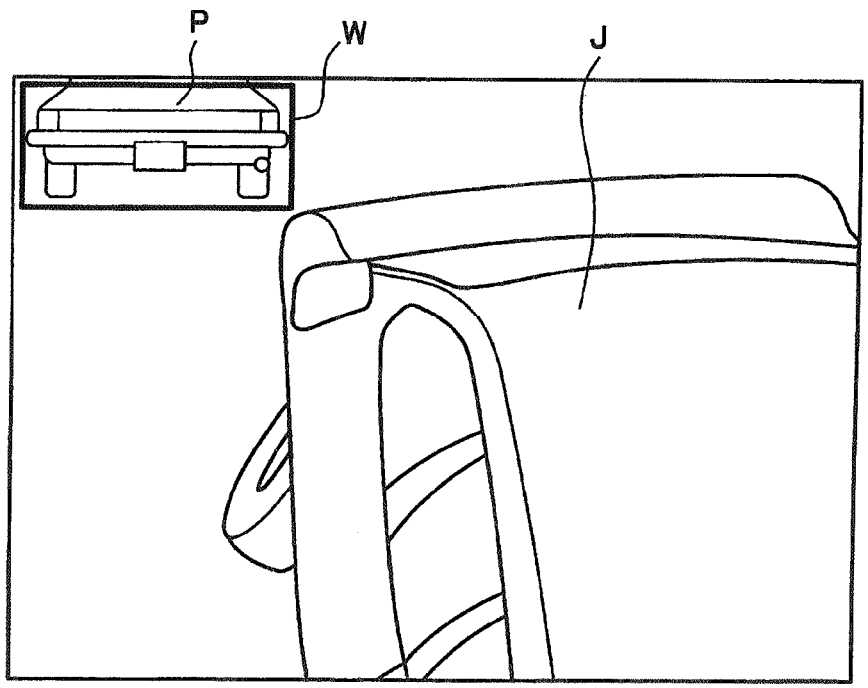
FIG. 24 illustrates a diagram of the image displayed on the displaying means when a vehicle, which is parked at front, is detected as an obstacle during a parallel parking operation.

The actuation of the surrounding monitoring system 101 when the vehicle 102 is parallel parked on the street will be explained. FIG. 24 illustrates an image diagram of an image displayed on the display 105 when a front vehicle P, which is parked in front of the vehicle 102, is detected as an obstacle. While the parallel parking operation, because a driver of the vehicle 102 generally cannot precisely confirm a distance between a front corner of the vehicle 102 and a rear corner of the front vehicle P from a drivers seat, it is difficult for the driver to determine whether or not the vehicle 102 collides with the front vehicle P. The driver can confirm the distance between the front corner of the vehicle 102 and the rear corner of the front vehicle P through the second image displayed on the display 105, and also can confirm the distance between the vehicle 102 and the front vehicle P in a longitudinal direction.

In this case, as shown in FIG. 24, the front vehicle P in the combined image of the first image captured by the first camera 104 and the second image captured by the second camera 103 may be enclosed by the highlighting frame W, and the icon J of the vehicle 102 may be displayed on the combined image. Each of the first image captured by the first camera 104 and the second image captured by the second camera 103 may be displayed on the display respectively, so that the driver can choose the viewpoint in order to confirm the distance between the vehicle 102 and the front vehicle P from a preferable direction. In this case, the image of the front vehicle P is displayed on the display 105 in a large scale, however, because an image corresponding to the position of the front vehicle P on the combined image is extracted from the first image and the second image, and the extracted image is enclosed by the highlighting frame W and displayed on the display 105, the front vehicle P can be confirmed as an obstacle even when it is to dark to see the display 105 and find the obstacle.

Thus, according to the surrounding monitoring ECU 107 in the third embodiment, the highlighting frame W is created for enclosing an obstacle detected in the first image captured by the first camera 104 and the second image captured by the second camera 103, the highlighting frame W is applied to the obstacle in the combined image on the display 105 in order to emphasize the obstacle as shown in FIG. 23. Thus, the driver can visually confirm the position and the size of the obstacle easily.

When the first camera 104 and the second camera 103 are provided as shown in FIG. 12, the first image captured by the first camera 104 overlaps on the second image captured by the second camera 103, and if the obstacle exists within the overlapping range, the obstacle may shown incompletely or at a different position in the combined image, in which the first image and the second image are combined. Thus, the borderline is provided in order to separate the usable range of the first image captured by the first camera 104 and the usable range of the second image captured by the second camera 103. The borderline is defined so as to be identical to the straight line that connects the position of the first camera 104 and the position of the second camera 103. In this configuration, because the overlapping range belongs to either one of the first image or the second image as shown in FIG. 15, even when the obstacle exists within the overlapping range, it can be displayed seamlessly and clearly on the combined image and displayed on the display 15. Further, the number of the obstacle and the position of the obstacle can be accurately displayed on the combined image; as a result, the driver of the vehicle can easily confirm the positional relationship between the vehicle and the obstacle.

The surrounding monitoring ECU 107 in the third embodiment inputs the wheel speed from each of the right-rear wheel speed sensor 109 and the left-rear wheel speed sensor 110, at the same time, and further, a yaw rate is inputted from the yaw rate sensor 108 in order to detect the traveling direction of the vehicle 102. Thus, the surrounding monitoring ECU 107 detects the estimated traveling locus of the vehicle 102. When the solid object exists on the estimated traveling locus of the vehicle 102, because it is considered that possibility that the vehicle collides with the solid object is high, such solid object is determined as an obstacle, and the highlighting frame W for the obstacle is created. Such created highlighting frame W is displayed on the combined image and displayed on the display 105 as shown in FIG. 21. Thus, the driver can confirm the existence of the obstacle in advance.

Further, when the obstacle moves, the position of the obstacle after a predetermined time can be estimated by detecting the positional difference of the obstacle and calculating the traveling direction and the traveling speed of the obstacle. If the estimated position of the obstacle after a predetermined time is on the estimated traveling locus of the vehicle 102, even if the vehicle 102 is traveling straight, the obstacle may approach to and collides with the vehicle 102. Thus, the highlighting frame W for the obstacle is created, and such created highlighting frame W is displayed on the combined image and displayed on the display 105 as shown in FIG. 22. Thus, the driver can confirm the existence of the obstacle, which may approaches to and collides with the vehicle 102 in advance.

Further, the surrounding monitoring ECU 107 in the third embodiment detects an image, which is similar to the obstacle, from the first image captured by the first camera 104 and the second image captured by the second camera 103, and emphasize the image by enclosing with the highlighting frame W and displayed the image on the combined image displayed on the display 105. Thus, even when the obstacle exists out of the overlapping range between the first image captured by the first camera 104 and second image captured by the second camera 103, the obstacle can be detected and emphasized with the highlighting frame W. Thus, the obstacle can be detected within the all images and emphasized with the highlighting frame W in order to provide the driver a good visibility.

When the highlighting frame W is displayed on the combined image on the display 105, the alert is outputted through the speaker 106 in order to let the driver know the existence of the obstacle auditorily. The alert may be outputted only when the obstacle exists on the estimated traveling locus of the vehicle 102, and thus, when the obstacle does not exists on the estimated traveling locus; only the highlighting frame is displayed on the display 105. Further, because the icon J is displayed on the display 105, the driver can confirm the positional relationship between the obstacle emphasized with the highlighting frame W and the vehicle 102.

The present invention is not limited to the above-mentioned embodiment and can be modified as follows.

In the third embodiment, the first camera 104 and the second camera 103 are provided at the front passenger's seat side in order to capture the vicinity of the front corner, however, the first camera 104 and the second camera 103 may be provided at the different position as far as it captures the surrounding near the front corner of the vehicle at the front passenger's seat side. For example, the first camera and the second camera may be provided so as to capture the vicinity of the rear corner at the front passenger's seat, or the first camera and the second camera may be provided so as to capture the image near the corner at the driver's seat.

In the third embodiment, the first camera 104 and the second camera 103 are provided at one side of the vehicle in order to capture the image of the one side of the vehicle, however, the first camera 104 and the second camera 103 may be provided at the different position as far as they widely capture the surrounding of the front of the vehicle and the rear of the vehicle. In this configuration, if the obstacle is emphasized with the highlighting frame or the like, even when it is dark and hard to confirm the existence of the obstacle in the image displayed on the display 105, the driver can confirm the position or the display range of the obstacle.

In the third embodiment, the yaw rate sensor 108 is used for detecting the traveling direction of the vehicle 102, however, a steering sensor or the like may be used alternatively in order to detect the traveling direction of the vehicle 102. The position of the yaw rate sensor 108 is not limited to inside of the instrument panel, and it may be provided at the under surface of the vehicle 102.

In the third embodiment, the obstacle is emphasized by the highlighting frame W, however, the obstacle may be displayed on the display 105 in a manner where it is marked out, or a mark may be applied to the obstacle at a position nearest to the vehicle 102.

According to the vehicle surrounding monitoring device in the present invention, when a first capturing means and a second capturing means are provided at the side of the vehicle, because a first image captured by the first capturing means overlaps on a second image captured by the second capturing means. In this configuration, if an obstacle exists within such overlapping range, the obstacle may be shown incompletely or the position of the obstacle may be different in a combined image of the first image and the second image. The vehicle surrounding monitoring device provides a borderline between the first image and the second image in a combined image of the first image and the second image so as to be identical with a line connecting a position of the first capturing means and a position of the second capturing means. Thus, because the overlapping range is included in either one of the first image or the second image, the obstacle existing within the overlapping range can be displayed seamlessly and clearly; as a result, the driver can confirm the positional relationship between the obstacle and the vehicle.

The vehicle surrounding monitoring device creates a highlighting mark applied to the obstacle, which is detected in the first image and the second image, and the highlighting mark is drawn in the image displayed on a displaying means. Thus, the position and the range of the obstacle can be displayed on the displaying means; as a result, the driver can visually confirm the obstacle visually.

The vehicle surrounding monitoring device inputs vehicle speed detected by a vehicle speed detecting means and also inputs a traveling direction of the vehicle detected by a traveling direction detecting means, in order to estimate a traveling locus of the vehicle. When a solid object exists on the estimated traveling locus, the vehicle can approach to and collide with the obstacle. The vehicle surrounding monitoring device determines such solid object as an obstacle displays the obstacle on the combined image on the displaying means with the highlighting mark. Thus, the driver can confirm the existence of the obstacle in advance.

Further, when the obstacle moves, the position of the obstacle after a predetermined time can be estimated by detecting the positional difference of the obstacle and calculating the traveling direction and the traveling speed of the obstacle. If the estimated position of the obstacle after a predetermined time is on the estimated traveling locus of the vehicle, even if the vehicle is traveling straight, the obstacle may approach to and collides with the vehicle. Thus, the highlighting mark the obstacle is created, and such created highlighting mark is displayed on the combined image and displayed on the display. Thus, the driver can confirm the existence of the obstacle, which may approaches to and collides with the vehicle in advance.

Because the solid object is detected by applying the difference calculating process to the first image captured by the first capturing means and the second image captured by the second capturing means, the solid object may not be detected out of the overlapping range, as a result, an obstacle cannot be detected out of the overlapping range. On the other hand, the obstacle is captured in a different way from different viewpoint, however, it is considered that the shape or the position of the obstacle may not differ too significantly to figure out what is it depending on the viewpoint. Thus, the vehicle surrounding monitoring device detects an image, which is similar to the obstacle, from the first image captured by the first capturing device and the second image captured by the second capturing device, and emphasize the image by enclosing with the highlighting mark and displayed the image on the combined image displayed on the displaying means. Thus, even when the obstacle exists out of the overlapping range between the first image and the second image, the obstacle can be detected and emphasized with the highlighting mark. Thus, the obstacle can be detected within all images and emphasized with the highlighting mark in order to provide the driver a good visibility.

When the highlighting mark is displayed on the combined image on the displaying means, the alert is outputted through the speaker in order to let the driver know the existence of the obstacle auditorily. The alert may be outputted only when the obstacle exists on the estimated traveling locus of the vehicle, and thus, when the obstacle does not exists on the estimated traveling locus; only the highlighting mark is displayed on the display. Further, because the icon is displayed on the display, the driver can confirm the positional relationship between the obstacle emphasized with the highlighting mark and the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle surrounding monitoring device comprising:
a first capturing means provided at a side of a vehicle in order to capture a first image;
a second capturing means provided at front relative to the first capturing means in order to capture a second image;
a displaying means for displaying the first image and the second image and for monitoring a vehicle surrounding;
an image process means by which a borderline between the first image and the second image is defined in a combined image of the first image and the second image so as to be identical with a straight line connecting a position of the first capturing means and a position of the second capturing means,
wherein the vehicle surrounding monitoring device extracts an image of a solid object from the first image captured by the first capturing means and from the second image captured by the second capturing means, and detects an obstacle from the solid object which may collide with the vehicle, and the vehicle surrounding monitoring device further includes a highlighting process means for creating a highlighting mark which is applied to the obstacle, a drawing process means for superposing the highlighting mark created by the highlighting process means on the combined image displayed on the displaying means, and
a similar image detecting process means that detects an image, which is similar to a shape of the obstacle captured in past time in the first image captured by the first capturing means and the second image captured by the second capturing means, and the highlighting process means creates the highlighting mark to be applied to the image detected by the similar image detecting process means;
wherein the similar image detecting process means detects an image when the obstacle exists out of the overlapping range between the first image and the second image.

2. A vehicle surrounding monitoring device comprising:
a first capturing means provided at a side of a vehicle in order to capture a first image;
a second capturing means provided at front relative to the first capturing means in order to capture a second image;

a displaying means for displaying the first image and the second image and for monitoring a vehicle surrounding; and an image process means by which a borderline between the first image and the second image is defined in a combined image of the first image and the second image so as to be identical with a straight line connecting a position of the first capturing means and a position of the second capturing means, wherein the vehicle surrounding monitoring device extracts an image of a solid object from the first image captured by the first capturing means and from the second image captured by the second capturing means, and detects an obstacle from the solid object which may collide with the vehicle, and the vehicle surrounding monitoring device further includes a highlighting process means for creating a highlighting mark which is applied to the obstacle, a drawing process means for superposing the highlighting mark created by the highlighting process means on the combined image displayed on the displaying means, and a similar image detecting process means that detects an image, which is similar to a shape of the obstacle captured in past time in the first image captured by the first capturing means and the second image captured by the second capturing means, and the highlighting process means creates the highlighting mark to be applied to the image detected by the similar image detecting process means, wherein the vehicle surrounding monitoring device further includes an alert outputting means for outputting an alert when the combined image, in which the highlighting mark created by the highlighting process means is superposed by the drawing means, is displayed on the displaying means;

wherein the similar image detecting process means detects an image when the obstacle exists out of the overlapping range between the first image and the second image.

3. A vehicle surrounding monitoring device comprising:

a first capturing means provided at a side of a vehicle in order to capture a first image;

a second capturing means provided at front relative to the first capturing means in order to capture a second image;

a displaying means for displaying the first image and the second image and for monitoring a vehicle surrounding; and an image process means by which a borderline between the first image and the second image is defined in a combined image of the first image and the second image so as to be identical with a straight line connecting a position of the first capturing means and a position of the second capturing means, wherein the vehicle surrounding monitoring device extracts an image of a solid object from the first image captured by the first capturing means and from the second image captured by the second capturing means, and detects an obstacle from the solid object which may collide with the vehicle, and the vehicle surrounding monitoring device further includes a highlighting process means for creating a highlighting mark which is applied to the obstacle, a drawing process means for superposing the highlighting mark created by the highlighting process means on the combined image displayed on the displaying means, and a similar image detecting process means that detects an image, which is similar to a shape of the obstacle captured in past time in the first image captured by the first capturing means and the second image captured by the second capturing means, and the highlighting process means creates the highlighting mark to be applied to the image detected by the similar image detecting process means, wherein an icon representing the vehicle is superposed on the image displayed on the displaying means;

wherein the similar image detecting process means detects an image when the obstacle exists out of the overlapping range between the first image and the second image.

4. The vehicle surrounding monitoring device according to claim 1, wherein the vehicle surrounding monitoring device further comprises:

a vehicle speed detecting means for detecting a vehicle speed;

a traveling direction detecting means for detecting a traveling direction of the vehicle;

a estimated locus creating means for estimating a traveling locus of the vehicle on the basis of the vehicle speed detected by the vehicle speed detecting means and the traveling direction of the vehicle detected by the traveling direction detecting means; and a first collision determining process means for determining whether or not the solid object is located on the estimated traveling locus estimated by the estimated locus creating means, and when it is determined that the solid object is located on the estimated traveling locus, making the highlighting process means create the highlighting mark to be applied to the obstacle.

5. The vehicle surrounding monitoring device according to claim 4, wherein the vehicle surrounding monitoring device further comprises:

a moving direction and speed of obstacle calculating means for calculating a traveling direction and a traveling speed of the obstacle by detecting a difference of the position of the obstacle, and estimating the position of the obstacle after a predetermined time; and a second collision determining process means for determining whether or not the estimated position of the obstacle is located upon the estimated traveling locus estimated by the estimated locus creating means, and when it is determined that the estimated position of the obstacle is located upon the estimated traveling locus, making the highlighting process means create the highlighting mark to be applied to the obstacle.

* * * * *